United States Patent
Soares et al.

(10) Patent No.: US 9,401,653 B2
(45) Date of Patent: Jul. 26, 2016

(54) POWER SUPPLY WITH SWITCHING CONVERTER

(71) Applicant: Bose Corporation, Framingham, MA (US)

(72) Inventors: Manoel Soares, Natick, MA (US); Michael B. Nussbaum, Newton, MA (US); Joseph Taher Mossoba, Cambridge, MA (US)

(73) Assignee: Bose Corporation, Framington, MA (US)

( * ) Notice: Subject to any disclaimer, the term of this patent is extended or adjusted under 35 U.S.C. 154(b) by 0 days.

(21) Appl. No.: 14/477,483

(22) Filed: Sep. 4, 2014

(65) Prior Publication Data

US 2016/0072392 A1   Mar. 10, 2016

(51) Int. Cl.
| | |
|---|---|
| *H02M 3/335* | (2006.01) |
| *H02M 3/337* | (2006.01) |
| *H02M 1/42* | (2007.01) |
| *H02M 1/00* | (2006.01) |

(52) U.S. Cl.
CPC ........ *H02M 3/33569* (2013.01); *H02M 1/4208* (2013.01); *H02M 3/337* (2013.01); *H02M 2001/0032* (2013.01)

(58) Field of Classification Search
CPC ..................... H02M 2001/007; H02M 3/3374; H02M 7/4826
USPC .............. 323/249, 250; 363/15–21.03, 22–26
See application file for complete search history.

(56) References Cited

U.S. PATENT DOCUMENTS

| | | | | |
|---|---|---|---|---|
| 4,661,896 | A * | 4/1987 | Kobayashi | H05G 1/20 323/266 |
| 4,785,387 | A * | 11/1988 | Lee | H02M 3/28 363/131 |
| 4,905,136 | A * | 2/1990 | Tanaka | H02M 3/3374 363/124 |
| 5,510,974 | A | 4/1996 | Gu et al. | |
| 6,728,118 | B1 * | 4/2004 | Chen | H02M 3/33592 363/24 |

(Continued)

FOREIGN PATENT DOCUMENTS

WO   WO 2014/182500   11/2014

OTHER PUBLICATIONS

Yungtaek Jang et al., "Light-Load Efficiency Optimization Method," IEEE Transactions On Power Electronics, vol. 25, No. 1, Jan. 2010.

(Continued)

*Primary Examiner* — Adolf Berhane
*Assistant Examiner* — Gary Nash
(74) *Attorney, Agent, or Firm* — Fish & Richardson P.C.

(57) ABSTRACT

Circuits and techniques for improving power converter efficiencies and controllability are disclosed. For example, a first converter stage includes a push-pull circuit topology and an isolating element including a magnetizing inductance for isolating a primary side of the first converter stage from a secondary side of the first converter stage. The magnetizing inductance may vary as a function of a current flowing in the primary side of the first converter stage. For example, the isolating element can be a transformer with a stepped gap core and have a varying magnetizing inductance profile.

14 Claims, 20 Drawing Sheets

(56) References Cited

U.S. PATENT DOCUMENTS

| | | | | |
|---|---|---|---|---|
| 6,774,758 | B2* | 8/2004 | Gokhale | H01F 3/14 336/110 |
| 8,222,772 | B1 | 7/2012 | Vinciarelli | |
| 8,711,580 | B2* | 4/2014 | Zhang | H02M 1/32 323/901 |
| 8,958,221 | B2* | 2/2015 | Adam | H02M 3/3374 363/131 |
| 2004/0046634 | A1 | 3/2004 | Gokhale | |
| 2012/0176101 | A1 | 7/2012 | Skinner | |

OTHER PUBLICATIONS

Mihai Ciobotaru et al., "A New Single-Phase PLL Structure Based on Second Order Generalized Integrator," Proceedings of PESC, 2006, pp. 1511-1516.

International Search Report and Written Opinion; PCT/US2015/047884; P. Riehl; Nov. 16, 2015; 15 pp.

* cited by examiner

POWER SUPPLY WITH SWITCHING CONVERTER

TECHNICAL FIELD

This description relates to power supplies.

BACKGROUND

A variety of types of power supplies (also called power converters) provide an approximately constant (i.e., DC or "direct current") output voltage from a sinusoidal (i.e., AC or "alternating current") input voltage (e.g., from an AC mains source), thus providing AC-DC conversion (also called "rectification"). Other types of power supplies provide AC-AC conversion, DC-DC conversion, or DC-AC conversion (also called "inversion"). Some power supplies include multiple stages, which may include a combination of different types of converters, such as a DC-DC converter stage within a DC-AC power supply. Converter stages that provide a DC voltage may use a regulator to maintain the DC voltage near a constant value. A linear power supply uses a linear regulator, and a switched-mode (or "switching") power supply uses a switching regulator that switches between on and off states to regulate power transfer and maintain the DC voltage.

SUMMARY

In one aspect, in general, a circuit includes a first converter stage including a current fed circuit topology, and an isolating element including a magnetizing inductance for isolating a primary side of the first converter stage from a secondary side of the first converter stage, wherein the magnetizing inductance is variable as a function of current flowing in the primary side of the first converter stage at currents lower than a current at which magnetic saturation is reached.

Aspects can include one or more of the following features. The current fed circuit topology can include a current fed push-pull topology. The current fed circuit topology can include a current fed full bridge topology. The isolating element can include a transformer. The isolating element can include a transformer with a stepped gap core. The circuit can include a power supply circuit. The first converter stage can include a current-fed push-pull topology. The circuit can include a control module configured to provide control signals to one or more elements of the circuit.

The circuit can include an inductor, and first and second switches coupled to respective terminals of the primary side of the first converter stage.

In another aspect, a circuit can include a first converter stage including a push-pull circuit topology, the first converter stage including at least one transformer that isolates a primary side of the first converter stage from a secondary side of the first converter stage, wherein the transformer includes a stepped gap core.

In another aspect, a circuit can include a first converter stage including a quasi-resonant flyback converter, and an isolating element including a magnetizing inductance for isolating a primary side of the first converter stage from a secondary side of the first converter stage, wherein the magnetizing inductance can be variable as a function of current flowing in the primary side of the first converter stage at currents lower than a current at which magnetic saturation is reached.

In another aspect, a method used in a circuit including a first converter stage of a power converter circuit implementing a push-pull topology, and an isolating element including a magnetizing inductance for isolating a primary side of the first converter stage from a secondary side of the first converter stage includes varying a switching frequency of the power converter circuit by causing the magnetizing inductance of the isolating element to vary over a range of values of input current flowing through the primary side of the first converter stage.

Aspects can include one or more of the following features. The method can include holding a duty cycle of the power converter circuit to be substantially constant during the variation of the switching frequency of the power converter circuit. The method can include lowering a minimum value of the duty cycle to extend a range of control over the input current flowing through the primary side of the first converter stage. The method can include adjusting a current conduction angle of the input current. The method can include adjusting a current conduction angle of the input current based on an average input power level to the power converter circuit.

The method can include determining a peak line voltage value of an input AC voltage to the power converter circuit, comparing the peak line voltage to stored peak line voltage values to determine a corresponding minimum commanded peak current value, computing a commanded current value corresponding to the peak line voltage value based on the determined corresponding minimum commanded peak current value, and adjusting a conduction interval of the input current based on the computed new commanded current value.

The method can include calculating a set of the stored minimum commanded peak current values based on an analysis of a range of input voltages to and loads on the power converter circuit.

Adjusting the conduction interval can include increasing a conduction angle as power output from the power converter circuit increases. Adjusting a conduction interval can include determining an average power level of the input power to the power converter circuit, and if the average power level is greater than a predetermined threshold of the average power level, deactivating the adjusting of the conduction interval of the input current.

The predetermined threshold of the average power level can be a product of a minimum peak value within an operating range of peak voltage values of the input AC voltage to the power converter circuit and the corresponding minimum commanded peak current value. The power converter circuit can include a quasi-resonant flyback converter.

The secondary side can include at least one capacitor configured to filter an output voltage for the power converter circuit. The secondary side can be configured to provide at least 200 W of power when the primary side is coupled to an AC line voltage. The secondary side can be configured to provide at least 500 W of power when the primary side is coupled to an AC line voltage. The secondary side can be configured to provide at least 2 kW of power when the primary side is coupled to an AC line voltage.

Various advantages of the overall design and operation of the different implementations of the power supply described herein may include a reduced parts count, enhanced efficiency, smaller size, and reduced cost. In addition, in some implementations, the techniques described herein can achieve frequency stabilization of power converters that utilize magnetizing inductance (Lm) as part of a resonant transition. Such frequency stabilization can be used to provide a combination of better efficiencies and a larger input voltage range of operation. For example, a cost of re-machining transformer cores in accordance with the techniques described herein can be small because the ferrite cores may already have gaps ground into them. Accordingly, it may be only a small additional cost to include a step as described herein in a center limb gap of the transformer cores.

Other features and advantages are apparent from the following description, and from the claims.

DESCRIPTION OF DRAWINGS

FIG. 11-1 shows example process for determining converter characteristics.

FIG. 11-2 shows example stepped gap dimensions.

Like reference numbers represent corresponding parts and/or portions throughout.

DESCRIPTION

Figure 1:
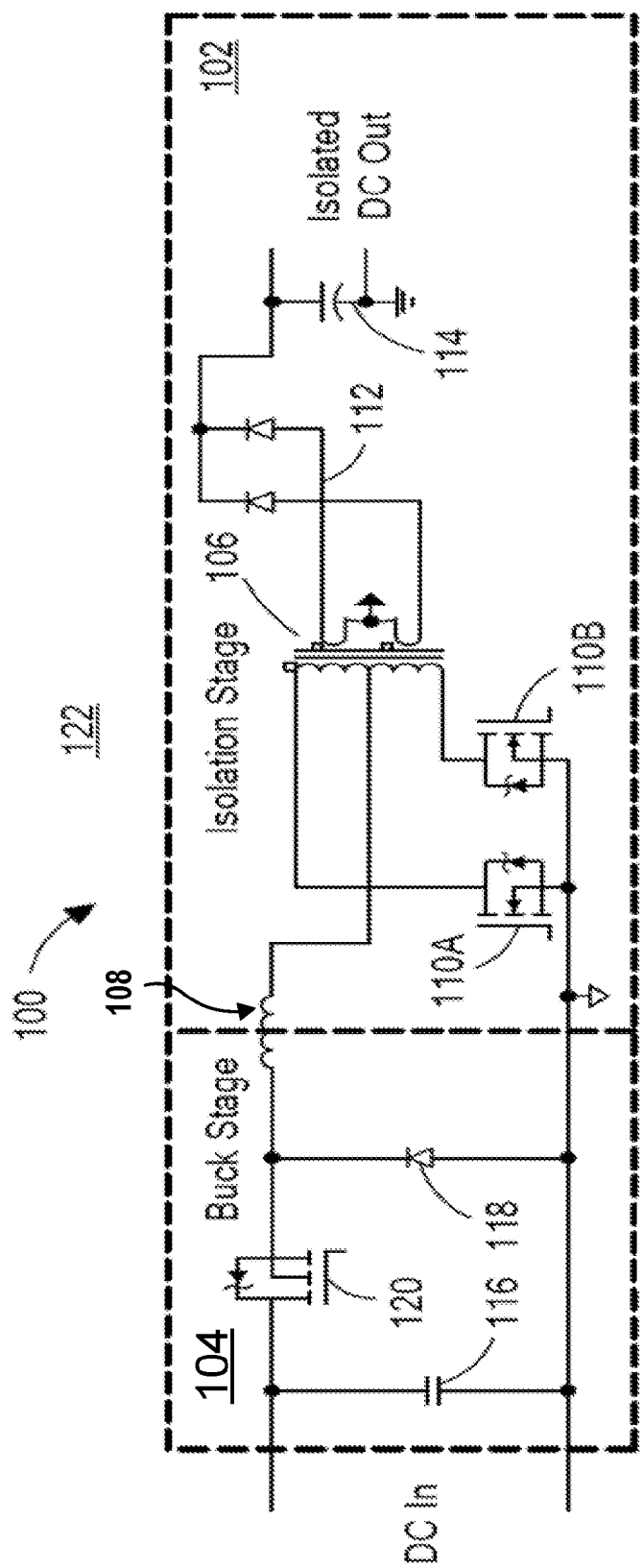
FIGS. 1-2 are example circuit diagrams of power supply converters.

Switched-mode power supplies can be classified as having different types of circuit topologies. For example, some topologies include one or more stages that have certain arrangements of components that perform specific functions (e.g., buck, boost, or buck-boost stages). Some "isolated" circuit topologies provide "isolation" using a transformer to prevent certain current flows between isolated stages of the power supply. Examples of different circuit topologies that can be configured to provide isolation include full bridge, half bridge, and push-pull. These circuit topologies correspond to different arrangements of switches, and can be used in either isolated or non-isolated power supplies. Another example of a circuit topology that can be configured to provide isolation is flyback, which refers to a specific way of using a transformer. For example, a flyback converter topology can include a buck-boost DC-to-DC converter topology (e.g., a converter topology in which an output voltage magnitude is either greater or less than an input voltage magnitude) with a split inductor as the transformer. Certain classes of power supply are also identified by certain specific features of their circuit topology. For example, a power supply (whether switched-mode or linear) that operates directly from an AC mains source is called an "off-line" power supply.

Some power supply circuits use power factor correction (PFC) to increase the circuit's "power factor," which can be defined as the ratio of the total "active power" (the true power being drawn from the source) to the total "apparent power" drawn from the source (based on a vector sum of the true power and the reactive power at the output). Increasing the power factor reduces losses incurred in the upstream power distribution system. Often, power supplies with PFC functionality include two stages: a front end boost converter controlled as a PFC stage, and an isolated DC/DC converter as a second stage. Some two-stage converters have a number of positive attributes, including reduced total switch root mean square (RMS) current for a given output power, but tend to entail significant complexity, with many semiconductor switches and passive components (e.g., inductors and capacitors). For some applications, the ability to supply large peak power is useful. Power supplies for audio applications, for example, typically need to supply peak powers of at least 3 times the average power. Other attributes besides RMS currents at maximum output can dominate the economics and desirability of a power supply under these circumstances.

Transformers used to isolate stages in these power supplies exhibit what is called "leakage inductance," which is inductance resulting from an imperfect coupling of magnetic field between the primary and secondary windings of the transformer. Some amount of leakage inductance is inevitable—it is impossible to have two coils experience perfect magnetic coupling. The effect of leakage inductance on the push-pull topology, for example, is generally to add voltage spiking on the drains of the switches, requiring extra voltage margin. Circuitry such as a dissipative or non-dissipative snubber circuits or devices, e.g., circuits or devices that suppress voltage transients, can be used to alleviate this problem, but there are limitations to that approach.

Transformers in these power supplies also experience magnetizing currents that are controlled as part of the power supplies' operation. For example, a magnetizing current may flow in the primary winding of a transformer to maintain magnetic flux in the transformer core.

Some example power supplies combine a PFC stage and an isolation stage into a single stage of the power supply, allowing a reduced parts count, and a smaller, less expensive converter. An example of a combined isolating PFC stage is a flyback converter operated with appropriate control. However, flyback converters are generally suitable for relatively low power operation, e.g., on the order of 100 W or below. By contrast, techniques described herein enable a power supply with an isolating PFC stage suitable for relatively large output power (e.g., 200 W-2 kW) for applications such as large audio amplifiers.

Techniques described herein may also enable current control and overall converter efficiencies. In general, a magnetizing inductance, which together with a current flowing in a transformer winding (e.g., I) can represent energy stored in the magnetic core and/or in small gaps between core halves according to the expression $E=\frac{1}{2}Lm*I^2$, can be used to provide soft switching in a converter. Soft switching occurs, for example, when a converter is switched at a time when the voltage across the converter switches is zero. Soft switching can help reduce power expended during switch transitions and improve efficiency across a range of topologies. In some implementations, soft switching can be obtained by using a small and well controlled magnetizing inductance. As an example, in a converter employing a transformer with a small magnetizing inductance (e.g., implementations of current-fed converters shown in FIGS. 1-3 below), a magnetizing current flowing through the transformer primary winding can momentarily equal a magnitude of an input current causing the current in the output circuit to drop to zero. As a result, the voltage across the transformer can also drop to zero and facilitate soft switching.

For example, the magnetizing inductance can be relatively small to minimize a turn-on time of the primary side switches.

Also, in some examples, the magnetizing inductance can be small to limit a total amount of energy stored in the transformer. For instance, the transformer magnetizing current can be relatively large, e.g., magnetizing current, Im, can be equal to the input inductor current). The energy stored in the transformer E is a function of the magnetizing inductance, Lm, and the magnetizing current, Im, and is given by the expression $E=\frac{1}{2}Lm*Im^2$. Accordingly, in some implementations, to limit the total amount of energy stored in the transformer, where relatively large magnetizing current is flowing, the magnetizing inductance may be correspondingly small. In some examples, as explained in detail below, the magnetizing inductance Lm may play a role in the switching frequency Fsw of the system (see, e.g. the derivation of an expression for switching frequency Fsw). To maintain the switching frequency above the audio band, the magnetizing inductance may be limited to below a maximum value. For instance, a typical range of magnetizing inductance Lm can be from 10 µHy to 500 µHy.

A degree of control over a transformer's magnetizing inductance relative to its magnetizing current can be gained by use of a stepped gap core, e.g., a transformer that has a stepped gap in its center, as described below (see, for example, FIG. 6 and related discussion).

FIG. 1 shows an example of a "current fed push-pull" circuit topology for use in a power supply. A power supply 100 includes a push-pull converter stage 102, and an upstream buck converter stage 104. In general, the power supply 100 of FIG. 1 is a DC-DC converter, which functions to output a DC output voltage from a DC input voltage. The push-pull converter stage 102 includes a transformer 106 with a center tap on its primary winding coupled to an inductor 108 common to the two stages. The primary winding is also coupled to a first switch 110A on one end and a second switch 110B on another end. The secondary winding is coupled to output diodes 112 and a capacitor 114 that provides an isolated DC output. The buck stage 104, which functions to step down the DC input voltage, includes an input capacitor 116, a switch 120 (here implemented with a metal-oxide-semiconductor field-effect transistor device or MOSFET), and a second switch 118 (here implemented with a diode). A control module 122 controls the switches of the power supply 100, including the opening and closing of the switches 110A and 110B. In other configurations the upstream buck converter may be omitted. Other variations of power supply circuits having a push-pull topology are possible. In some implementations, digital control and silicon carbide (SiC) power devices that can tolerate relatively high voltages within the power supply circuit can be used.

Figure 2:
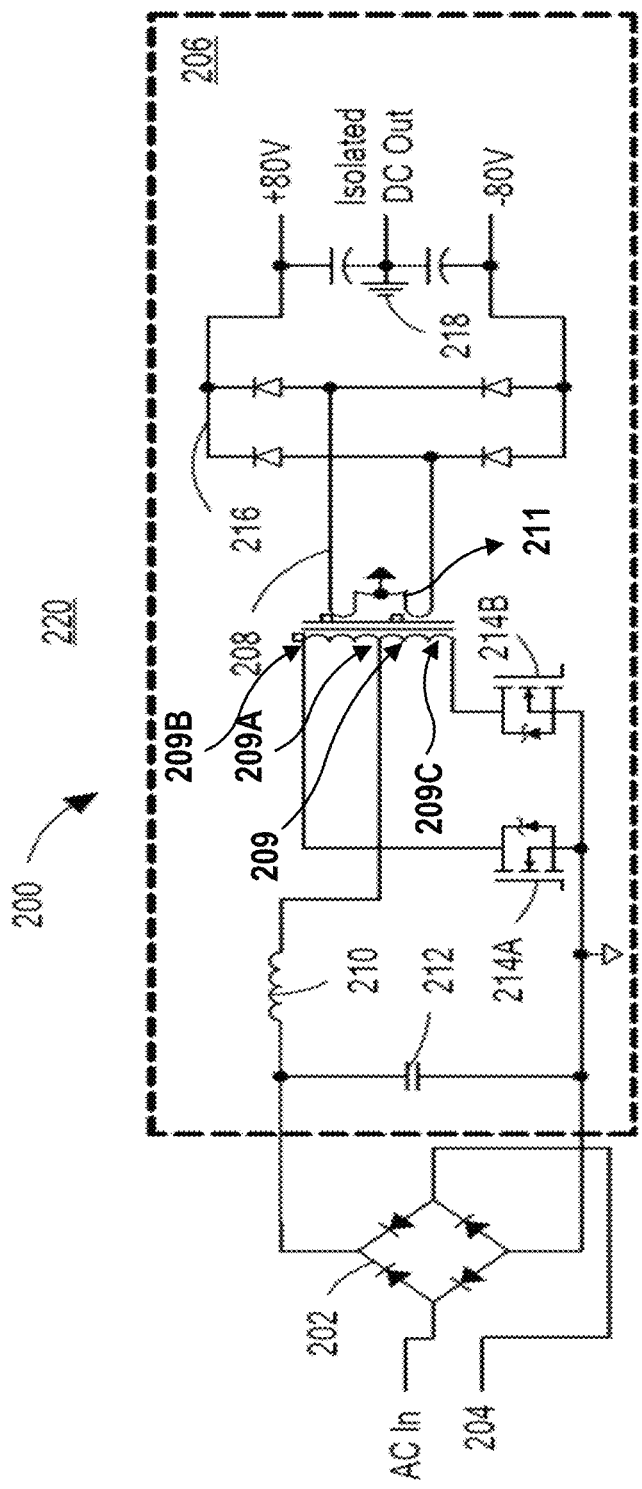

FIG. 2 shows an example of a power supply 200 without the upstream buck stage 104 of the power supply 100. In general, the power supply 200 of FIG. 2 is an AC-DC converter, which functions to output a DC output voltage from an AC input voltage. An input rectifier 202 (an arrangement of diodes) couples an AC input 204 (e.g., an AC line voltage) to an isolated PFC converter 206 having a push-pull circuit topology. The converter 206 includes a transformer 208 with a center tap 209A on its primary winding 209 coupled to an energy storage element, e.g., an input inductor 210, and a secondary winding 211. These components, together with switches 214A and 214B, function as an isolated boost converter in accordance with the principles described herein.

The primary side of the isolated PFC converter 206 also includes an input capacitor 212. The primary winding 209 is also coupled to a first switch 214A on one end and a second switch 214B on the other end. The switches 214A and 214B are part of the switching regulator that controls the DC output voltage, as well as the AC input current. The secondary winding 211 is coupled to output rectifiers 216 (an arrangement of diodes), and a capacitor set 218 that provides an isolated DC output voltage. A control module 220 controls the switches of the power supply 200, including the opening and closing of the switches 214A and 214B, as described in more detail below. With the presence of the input inductor 210 coupled to the center tap 209A of the transformer 208, this power supply 200 is also an example of a power supply having a current-fed push-pull topology.

Figure 3:
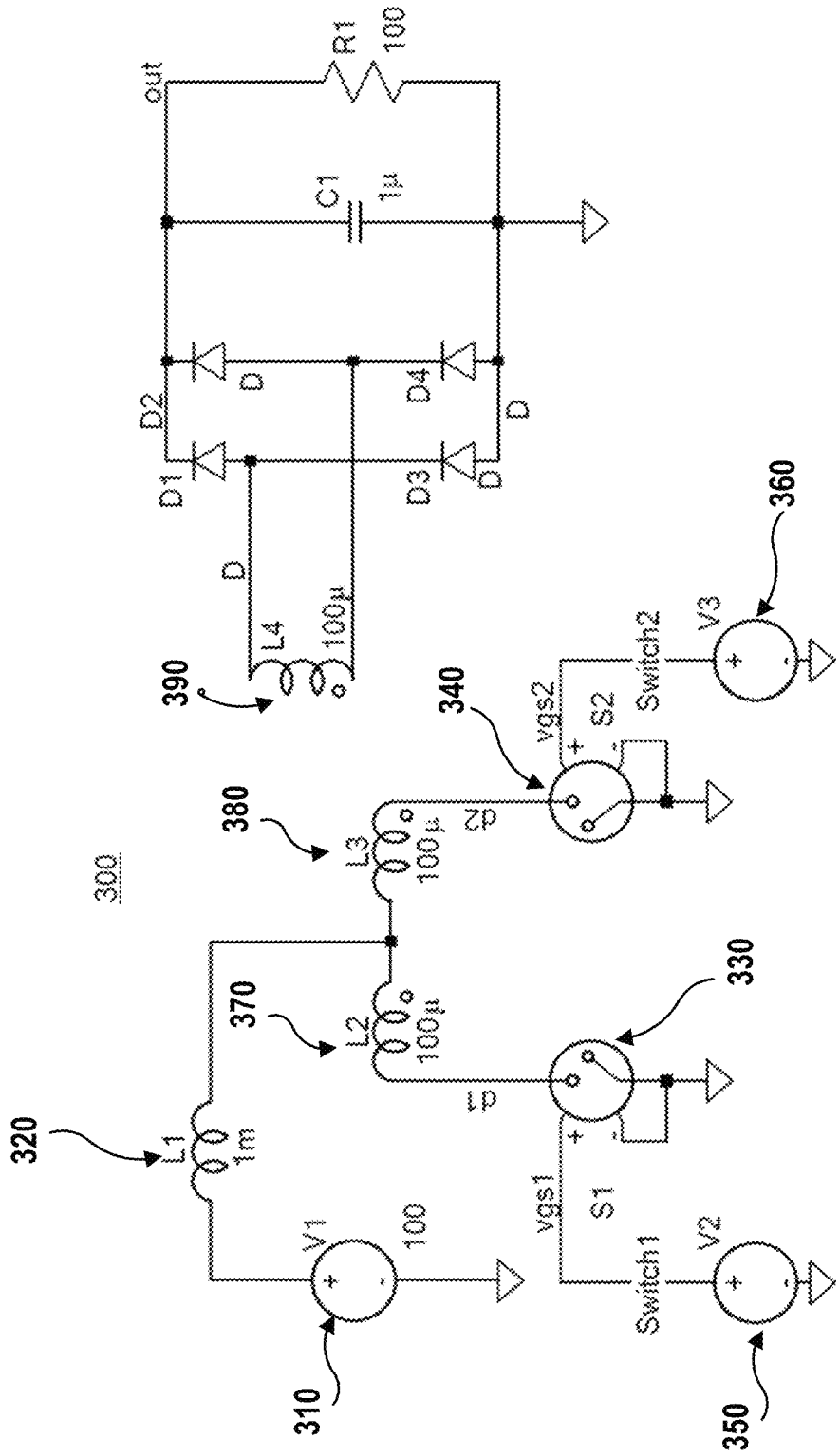
FIG. 3 is an example circuit model of power supply converter of FIG. 2.

The basic operation of the power supply 200 can be described with reference to a circuit model 300 of a Simulation Program with Integrated Circuit Emphasis (SPICE) circuit simulator program, shown in FIG. 3. A first voltage source V1 310 represents the AC line voltage, an input inductor L1 320 represents the input inductor 210. A switch S1 330, representing switch 214A, is controlled by a control signal represented by a second voltage source V2 350, and a switch S2 340, representing switch 214B, is controlled by a control signal represented by a third voltage source V3 360. Inductors L2 370 and L3 380 represent the two portions of the primary winding 209 of the transformer 208, from the center tap 209A to one side of the primary winding 209B, and from the center tap 209A to the other side of the winding 209C, respectively. An inductor L4 390 represents the secondary winding 211 of the transformer 208.

Figure 4:
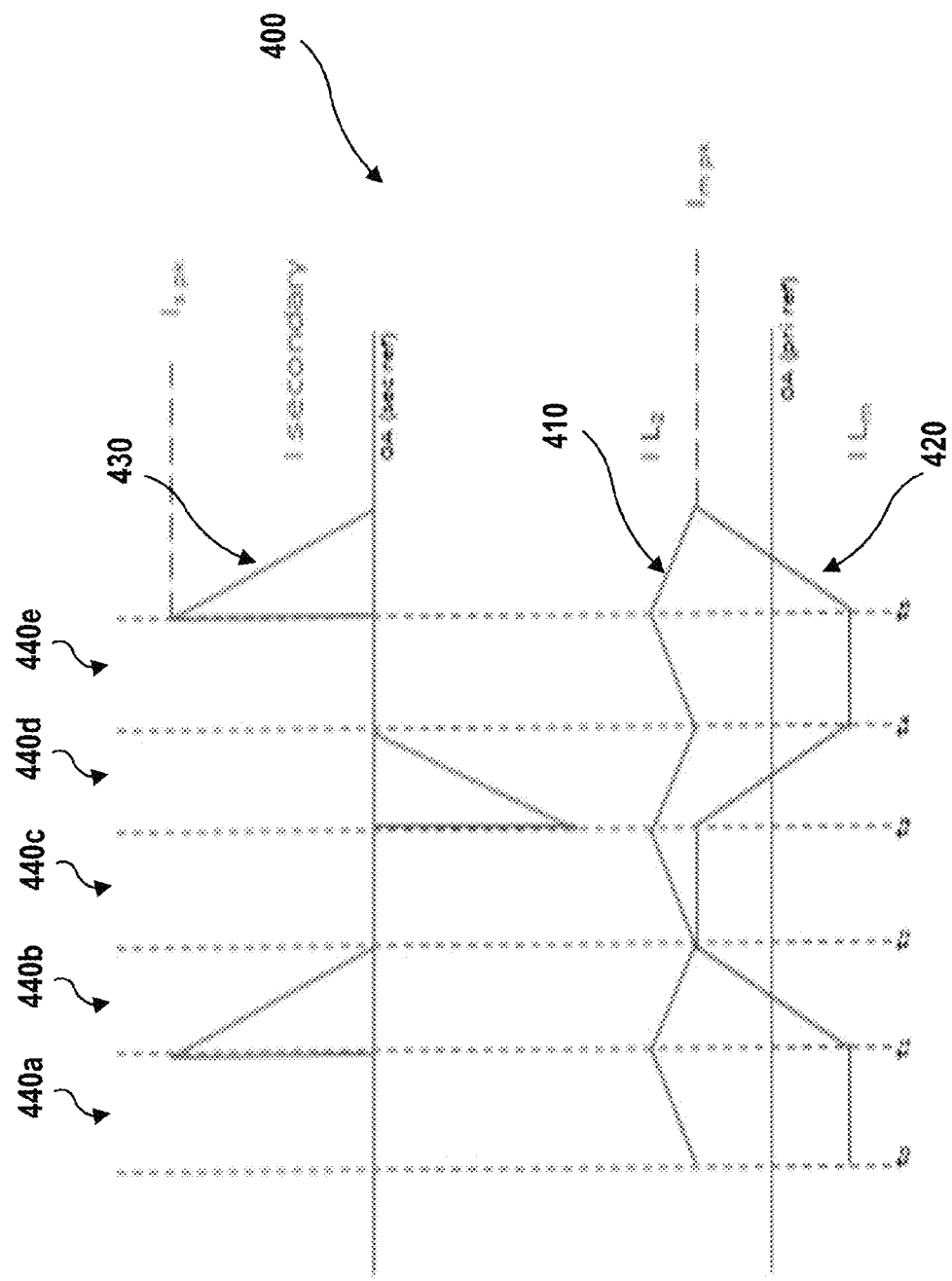
FIG. 4 is an example plot of circuit signal waveforms.

FIG. 4 shows example waveforms 400 corresponding to the operation of power supply 200. A waveform 410 represents current in the input inductor L1 210, a waveform 420 represents a magnetizing current (current flowing to maintain magnetic flux) in the primary winding 209 of the transformer 208, and a waveform 430 represents current in the secondary winding 211 of the transformer 208.

During a time period from $t_0$ to $t_1$ (represented in FIG. 4 as 440a), both switches 214A and 214B are ON. For example, control module 220 can cause switches 214A and 214B to turn ON by applying a certain voltage above a rated threshold voltage level at the respective gates of the switches 214A and 214B. As a result, voltage from the rectifier 202 (e.g., input voltage to the isolated PFC converter 206) can be applied across the inductor 210. The voltage across the inductor 210 causes a current through the inductor 210 (shown by waveform 410, $I_L$) to ramp up during period 440a.

The inductor 210 is connected to a center-tap 209A of the primary winding 209 of transformer 208. The current through inductor 210 flows through the center-tap 209A and out of ends 209B and 209C of the primary winding 209. The flow of current through inductor 210 and in opposite directions out of ends 209B and 209C of the primary winding 209 results in zero volts across the primary winding 209 of the transformer 208. With zero volts across the primary winding 209, there is no change in the magnetizing current (shown by waveform 420, $I_{LM}$) during period 440a. In addition, no current flows in the secondary winding 211 (shown by waveform 430).

During a time period $t_1$ to $t_2$ (represented in FIG. 4 as 440b), switch 214B remains ON while switch 214A is turned OFF. The current through inductor 210 now flows out of end 209C of the primary winding 209. There is no current flowing out of end 209B of the primary winding 209. In the meantime, because of the voltage across the primary winding 209, the magnetizing current in the primary winding 209 (waveform 420) begins to ramp up and reverses polarity from negative to positive. During the same period 440b, the current through the inductor 210 (waveform 410) falls as it drives the output voltage on the secondary winding 211. As a result, the effective current flowing in the primary winding 209 is represented as a difference between the current through the inductor and the magnetizing current ($I_L - I_{LM}$).

The resulting current flowing in the secondary winding 211 (waveform 430) is the effective current flowing in the primary winding 209 multiplied by the turns ratio, N of the transformer 208. Thus, the current in the secondary winding 211 (waveform 430) also ramps down with the current through the inductor during period 440b. During period 440b, the voltage across the transformer is constrained by the output voltage Vout, which is also the voltage that drives changes in the magnetizing current in the transformer 208.

During period $t_2$ to $t_3$ (represented in FIG. 4 as 440c), both switches 214A and 214B are turned ON again. As a result, the current flowing through the inductor 210 (waveform 410) ramps back up. With zero volts across the primary winding 209, there is no change in the magnetizing current (shown by waveform 420, $I_{LM}$) during period 440c. In addition, no current flows in the secondary winding 211 (shown by waveform 430).

During period t3 to t4 (represented in FIG. 4 as 440d), switch 214A remains ON while switch 214B is turned OFF. The current through inductor 210 now flows out of end 209B of the primary winding 209. There is no current flowing out of end 209C of the primary winding 209. In the meantime, because of the voltage across the primary winding 209, the magnetizing current in the primary winding 209 (waveform 420) begins to ramp down and reverses polarity from positive to negative. During the same period 440c, the current through the inductor 210 (waveform 410) falls as it drives the output voltage on the secondary winding 211. As a result, the effective current flowing in the primary winding 209 is represented as a difference between the current through the inductor and the magnetizing current ($I_L - I_{LM}$). The flow of the effective current is in a direction opposite to that during period 440b. As such, the resulting current flowing in the secondary winding 211 (waveform 430) is the effective current flowing in the primary winding 209 multiplied by the turns ratio, N of the transformer 208, but in the opposite direction.

During period $t_4$ to $t_5$ (represented in FIG. 4 as 440e), both switches 214A and 214B are turned ON again. As a result, the current flowing through the inductor 210 (waveform 410) ramps back up, there is no change in magnetizing current (shown by waveform 420, $I_{LM}$) and no current flows in the secondary winding 211 (shown by waveform 430). Periods 440a through 440e describe a complete cycle, and during operation, the power supply 200 repeats this general cycle.

In some instances, a time consumed by a resonant transition at switch turn-on (e.g., which occur at transition times $t_2$ and $t_4$ in FIG. 4) may be, e.g., a quarter period of the a resonant ring frequency defined by $$\frac{1}{2\pi * \sqrt{Lm * C}},$$

where Lm is the magnetizing inductance. The capacitance C is the effective capacitance seen by the center tap of the primary. For example, the effective capacitance may include a sum of the switch output capacitance, reflected secondary side rectifier capacitance, transformer capacitance, and any additional capacitances that may be added in the circuit. For example, the capacitance can be designed to be large (e.g. by adding additional capacitors or increasing the size of existing capacitors). In this manner, switching losses that occur during switch turn-off, e.g., which occur at transition times $t_1$ and $t_3$ in FIG. 4, are minimized. To maintain the switch turn-on time such that it is relatively small, a relatively small magnetizing inductance (e.g., 10 µHy<Lm<500 µHy) can be used.

Techniques and systems described herein can be understood by first considering an analysis of a non-stepped core implemented in the transformer 208. A duty cycle, D that represents a relative period of time when a switch is ON, expressed as a percentage, ratio, or numeric value between 0 and 1 can be defined for the example power supply circuit 200, as shown below.

$$D = \frac{t_1 - t_0}{t_2 - t_0}$$

Variables $t_0$, $t_1$, and $t_2$ in the expression above correspond to the times $t_0$, $t_1$, and $t_2$ shown in FIG. 4. A switching frequency, $F_{sw}$ for the power supply circuit 200 can be defined as:

$$F_{sw} = \frac{1}{t_4 - t_0}$$

Similarly, variables $t_0$ and $t_4$ in the expression above correspond to the times $t_0$ and $t_4$ shown in FIG. 4. An expression for gain (G) for the power supply circuit 200 is similar to that of a boost converter, with the transformer primary to secondary ratio expressed as N:1:

$$G = \frac{V_o}{V_i} = \frac{1}{N} \frac{1}{1 - D}$$

Variables Vo and Vi in the expression above represent output and input voltages of the power supply 200.

A voltage across the inductor 210 is proportional to a rate of change of the current flowing through the inductor, as expressed by the relation $$V = L \frac{di}{dt}.$$

Applying this relation to the circuit analysis of power supply 200 yields the following expression:

$$dt = t_2 - t_1 = L_m \frac{2 * I_{mpk}}{N * V_o}$$

Variable Lm in the expression above represents a magnetizing inductance of the transformer 208. The magnetizing inductance can be expressed in inductance units, e.g., Henries, and together with a current flowing in a transformer winding (e.g., I) can represent energy stored in the magnetic core and/or in small gaps between core halves according to the expression E=½Lm*I².

An off-time during which current flows in the secondary winding is given by the expression (1−D)*T. Applying the expression, $$V = L \frac{di}{dt},$$

the following expressions can be derived: dt=(1−D)T=L*di/V=Lmag.sec.referenced*Ispk/Vo.

Thus, T=Lmag.secondary.referenced*(Ispk/Vo)*(1/(1−D)). Taking the inverse of T, the switching frequency can be obtained:

$$Fsw = \frac{Vo*(1-D)}{Lmag \cdot secondary \cdot referenced * Ispk}.$$

This expression is referenced to the secondary side of the transformer.

In order to rewrite Fsw with quantities reflected to the primary, we note that for a turns ratio N:

$$Lmag \cdot secondary \cdot referenced = \frac{Lm}{N^2}$$

And, $$Io = \frac{Ispk}{2} = \text{an average value of an output current having,}$$

e.g., a triangular shape and a peak value Ispk.

Substituting in the expression for Fsw, the following expression can be obtained:

$$Fsw = (1-D) * \frac{Vo}{\left(\frac{Lm}{N^2}\right)*2*Io}$$

Further, making a zero-ripple assumption in IL, an output current is as shown below:

$$Io = N*IL = N*Impk$$

Substituting again in the expression for Fsw, the following expression can be obtained:

$$Fsw = (1-D) * \frac{Vo}{\left(\frac{Lm}{N^2}\right)*2*N*Impk}$$

The above expression yields:

$$Fsw = (1-D) * \frac{Vo}{\left(\frac{Lm}{N}\right)*2*Impk}$$

In this manner, an expression for Fsw with primary-reflected Lm and Impk can be obtained:

$$Fsw = (1-D)*N*\frac{Vo}{Lm*2*Impk}$$

According to the expression for switching frequency $F_{sw}$, when duty cycle D is held constant (i.e. voltage gain, G, is constant), the switching frequency of the system is inversely proportional to the magnetizing inductance $L_m$, and also to the peak magnetizing current $I_{mpk}$.

In examples where an effect of ripple in the input inductor current is ignored (i.e., ignoring an AC component of the current in inductor 210), the new expression also gives an inverse relationship between switching frequency and load current. The load current is an average of the rectified secondary current, Isecondary (e.g., waveform 430 of FIG. 4). Thus, if an input voltage is maintained constant, then the duty cycle of the power supply 200 is constant, and the peak values of the secondary current, Is pk, is proportional to the load current.

Taking into account the effect of ripple in the input inductor current, a more complex expression as shown below can be obtained (note that the expression below reduces to the simpler expression for switching frequency derived above as the input inductance approaches infinity (i.e., $L_2 \rightarrow \infty$), at which point $I_{mpk}=I_{inav}$) where $I_{inav}$ represents an average input current:

$$F_{sw} = (1-D)\frac{-(L_m*N_s*V_i)+(L_2*N_p*V_o)+(L_m*N_p*V_o)}{(N_s)*(L_2)*(L_m)*(2)*(I_{in\;av})}$$

Variables $N_s$ and $N_p$ represent numbers of turns in secondary and primary windings 211, 209 respectively of the transformer 208.

With a fixed, i.e., non-stepped or uniform gap core, a power converter transformer can exhibit a magnetizing inductance (Lm) that is insensitive to magnetizing current until it reaches saturation. With a stepped gap core, by contrast, the transformer 208 can have a high value of magnetizing inductance $L_m$ at low currents as explained further below. At higher currents (see, e.g., FIG. 6 and description below), once the stepped gap of the core saturates, the magnetizing inductance can revert to an $L_m$ value that is similar to a non-stepped transformer core. At even higher currents both the stepped and the non-stepped gap transformers can saturate and $L_m$ can tend towards 0. The sensitivity of the stepped gap core can be advantageous in certain applications.

Figure 5:
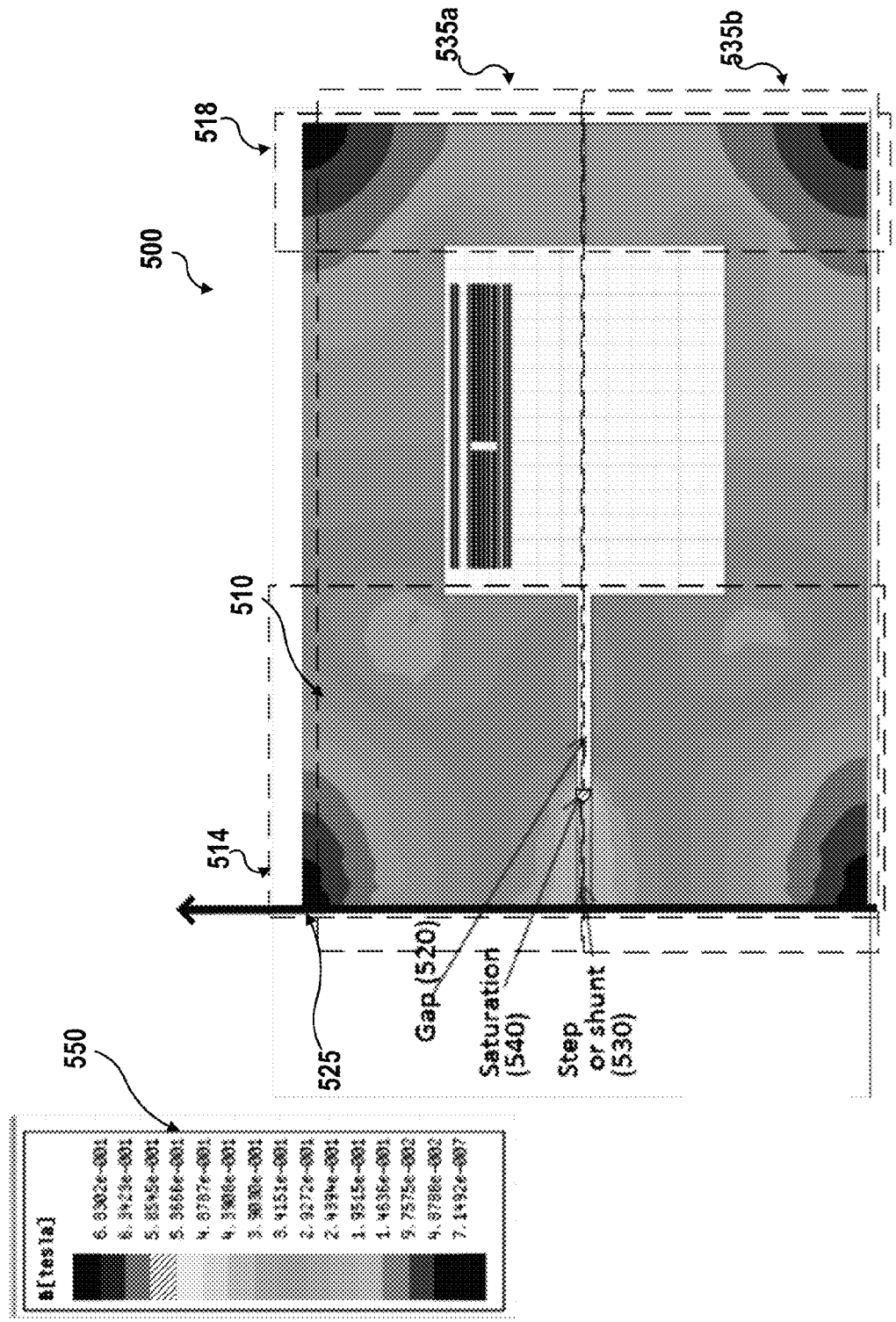
FIG. 5 shows an example graph demonstrating core magnetization.

FIG. 5 shows an example magnetization pattern 500 on a cross-section of a portion of a stepped gap transformer core 510. For example, transformer core portion 510 can be used in transformer 208. Transformer core portion 510 includes a center limb portion 514 (only half a width of a typical center limb is shown in FIG. 5) and a side limb 518. In interpreting FIG. 5, for example, transformer core portion 510 may be rotated 360° about an axis 525 to obtain a core for the transformer 208. As shown, transformer core portion 510 includes a gap 520. In a non-stepped transformer core, gap 520 may extend along an entire width of center limb portion 514.

In a stepped gap transformer core, however, as shown, gap 520 is interrupted by a step or a shunt 530. Step or shunt 530 can be of a same ferromagnetic material used to construct transformer core portion 510. A transformer core can be assembled by machining two core halves 535a, 535b separately and combining them to form a single core (i.e. transformer core portion 510). For example, step 530 can be machined into the core half 535a before being combined with the counterpart core half 535b (also having a corresponding step 530). In some examples, step 530 can be machined by creating a first step portion in the first core half 535a, and creating a second step portion in a second, different core half 535b. Then, the two core halves 535a, 535b may be combined. In other examples, the transformer core can be assembled from a single core portion, or from two core halves where only one half includes a step portion.

Core magnetization is measured in terms of Teslas or T, a derived unit of magnetic field strength or magnetic flux density, which is denoted as B. The magnetization pattern 500 of the transformer core portion 510 can be understood with reference to a reference scale 550, as shown in FIG. 5. For example, scale 550 ranges from $7.1492 \times 10^{-7}$ T (relatively low magnetization) to $6.8302 \times 10^{-1}$ T (relatively high magnetization, e.g., at or near magnetic "saturation" state, which refers to a state when increasing the magnetic field strength cannot further increase the magnetization of the material). While example ranges and values for the magnetic field strength or flux density are shown and described herein, it should be understood that other ranges and values for the magnetic field strength or flux density may be possible.

As shown, as an excitation current and magnetic field strength is increased, transformer core portion 510 saturates in regions substantially near the step region 540 at relatively moderate levels of excitation current (e.g., saturation begins at around Im=2 A).

Figure 6:
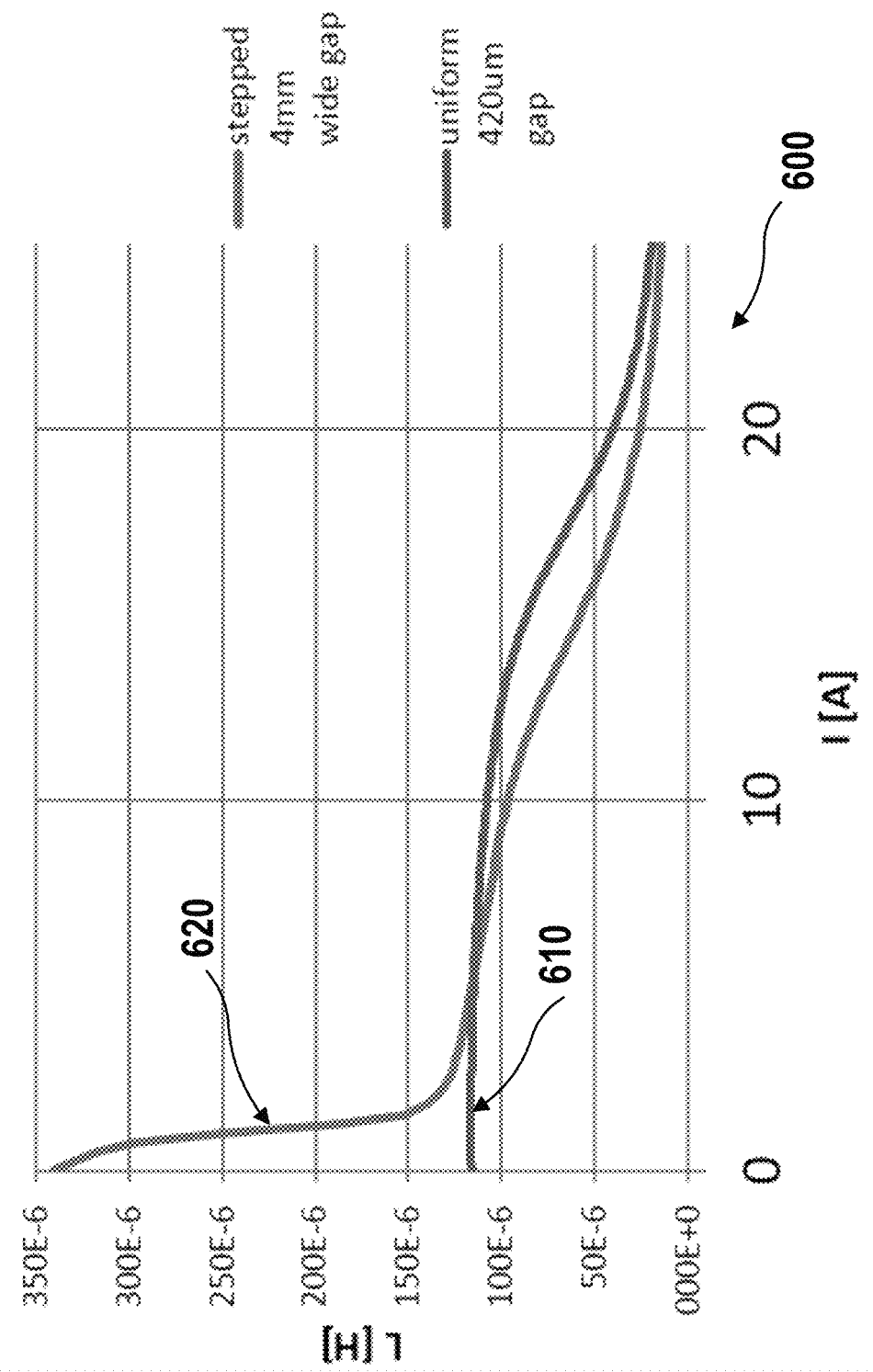
FIG. 6 shows an example graph comparing magnetizing inductances of a stepped gap and a non-stepped (uniform) gap core.

Referring to FIG. 6, a graph 600 is shown comparing changes in magnetizing inductances for an example non-stepped (i.e. uniform gap) core and an example stepped gap core. Curve 610 shows a magnetizing inductance curve for a non-stepped gap core. Curve 620 shows a magnetizing inductance curve for a stepped gap core. As shown, with a stepped gap, a transformer (e.g., transformer 208 with a stepped gap as shown in FIG. 5) has a very high magnetizing inductance Lm (e.g., $150-350 \times 10^{-6}$ H) at low currents (e.g., less than 3 A). At high currents (e.g., between 10-20 A), once the step in the core saturates it reverts to an Lm (e.g., $50-100 \times 10^{-6}$ H) similar to the non-stepped system. At even higher currents (e.g., greater than 20 A) both the stepped and the non-stepped gap transformers saturate and Lm tends towards 0.

An example benefit of having a magnetizing inductance profile as shown for the stepped gap core above (e.g., curve 620) is that at low current magnitudes, a switching frequency of the primary side switches may be reduced. At high current magnitudes, once the stepped gap of the core saturates, the magnetizing inductance can revert to an Lm value that is similar to a non-stepped gap core. In this manner, the switching frequency can be stabilized over a range of current magnitudes. Frequency stabilization can lead to improvements in converter efficiency and a larger input voltage range of operation.

Figure 7:
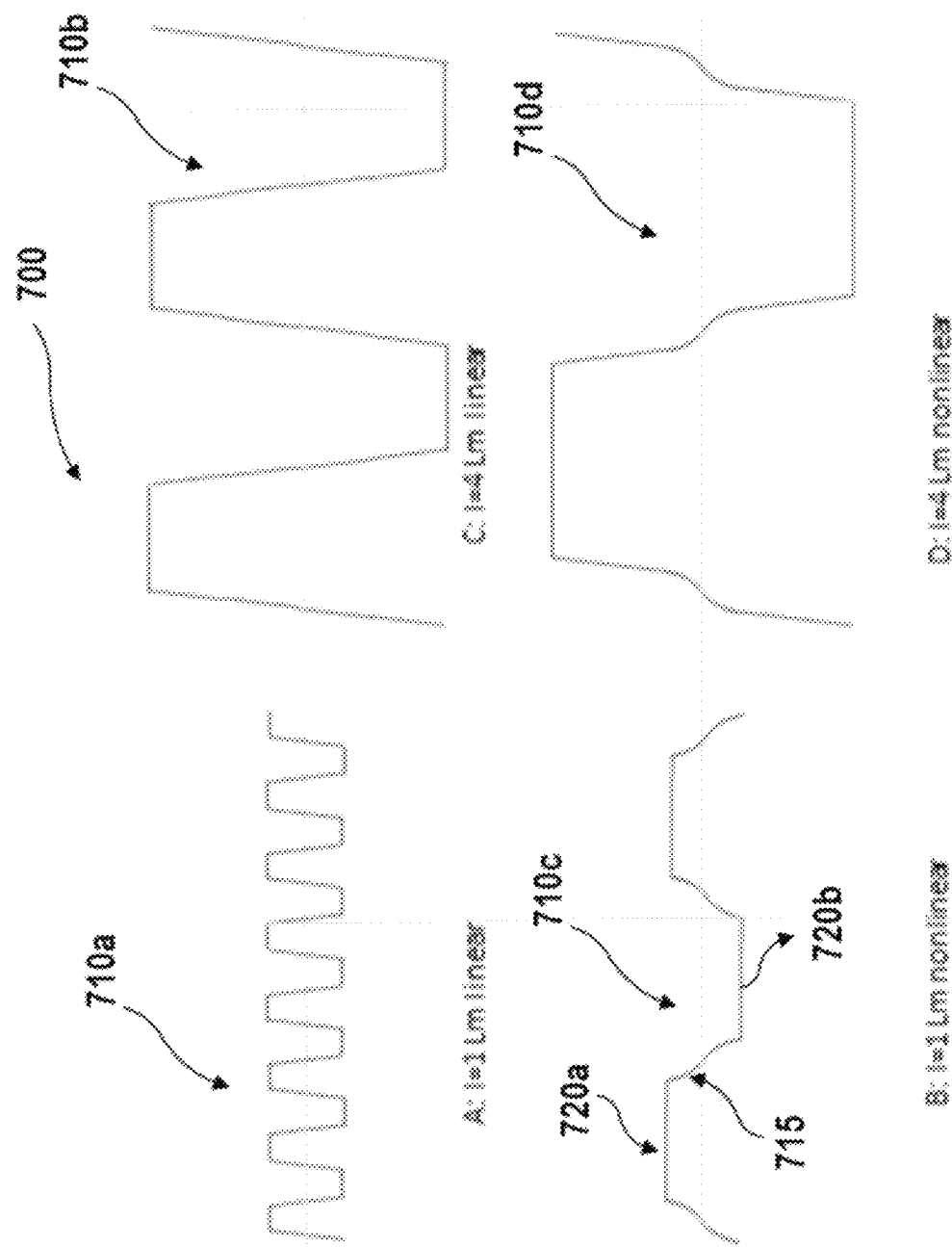
FIG. 7 shows example plots of magnetizing current waveforms.

One example effect of a stepped gap in a transformer core is that a rate of change of magnetizing current $$\left(\frac{di}{dt}\right)$$

is not constant. As noted above, an example benefit of a non-constant rate of change of magnetizing current is that the magnetizing current transitions at low magnitudes of magnetizing currents are slower and the magnetizing current transitions at high magnitudes of magnetizing currents are faster. For instance, a rate of change of magnetizing current is a function of an absolute level of the magnetizing current, Im. Referring to FIG. 7, magnetizing current waveforms 700 are shown for different cases corresponding to different absolute magnetizing current levels and linearity of magnetizing inductance, Lm.

For example, case A shows an example waveform 710a where the magnetizing current level is Im=1 A and the magnetizing inductance is linear (i.e., Lm is linear). As shown, this results in a relatively high frequency of operation. Case C shows an example waveform 710b where the magnetizing current level is Im=4 A and the magnetizing inductance is linear (i.e., Lm is linear), resulting in a relatively lower frequency of operation. In some implementations, because the magnetizing inductance, Lm is linear the switching frequency is inversely proportional to the magnetizing current, Im. Accordingly, for case C, to get a same duty cycle as for case A, the switching frequency is now a fourth (¼) of the switching frequency for case A.

Referring to case B, an example waveform 710c is shown where the magnetizing current level is Im=1 A and the magnetizing inductance is nonlinear (i.e., Lm is nonlinear). At low magnetizing current levels, the Lm value is high (see, e.g., FIG. 6 and accompanying description). As a result, a transition 715 from a first stable value 720a of the magnetizing current to a second stable value 720b is slower than when compared to the linear Lm cases (cases A and C). As such, the switching frequency for waveform 710c is less when compared to the switching frequency of case A.

Case D shows an example waveform 710d where the magnetizing current level is Im=4 A and the magnetizing inductance is nonlinear (i.e., Lm is nonlinear). As shown, a change in frequency between cases C and D is less than a change in frequency between cases A and B. This is because, as shown in FIG. 6, as the magnetizing current increases, the magnetizing inductance approaches non-stepped operation. Accordingly, use of a nonlinear Lm (e.g., by use of a stepped gap as shown in FIG. 5) can stabilize an operating frequency of a power supply converter. In some implementations, with material with a square hysteresis loop that saturates abruptly, a power supply converter can operate with an off time that is independent of current level and a function of the voltage times time product (V*T) across the transformer during that off time.

Figure 8:
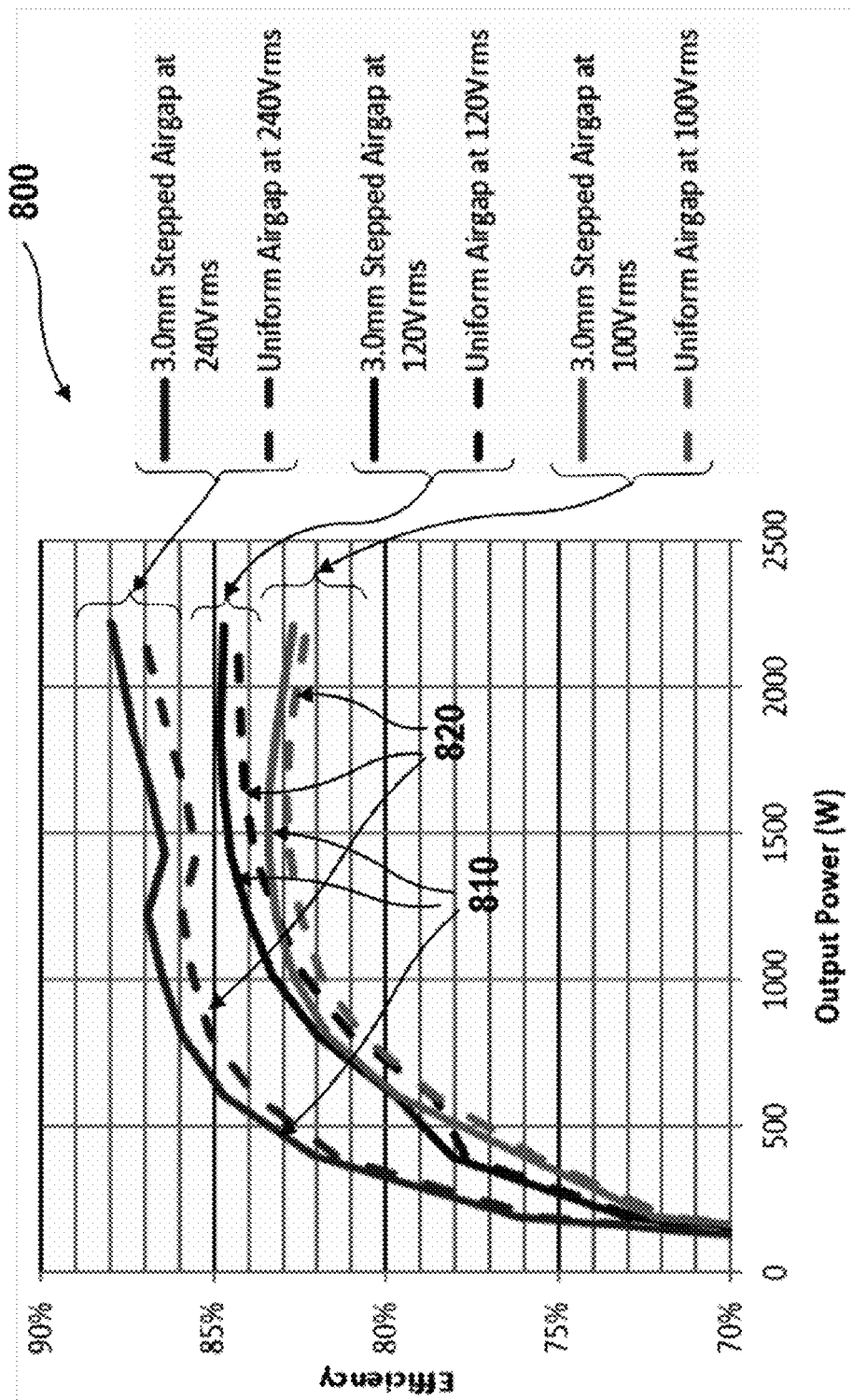
FIGS. 8-9 show example graphs comparing efficiencies of a stepped gap core and a non-stepped gap core.

FIG. 8 shows example efficiency comparisons between a stepped (solid curves 810) and uniform (dashed curves 820) gap transformer in this application. It can be seen that use of a stepped gap can increase system efficiency at substantially all input voltage levels.

Figure 9:
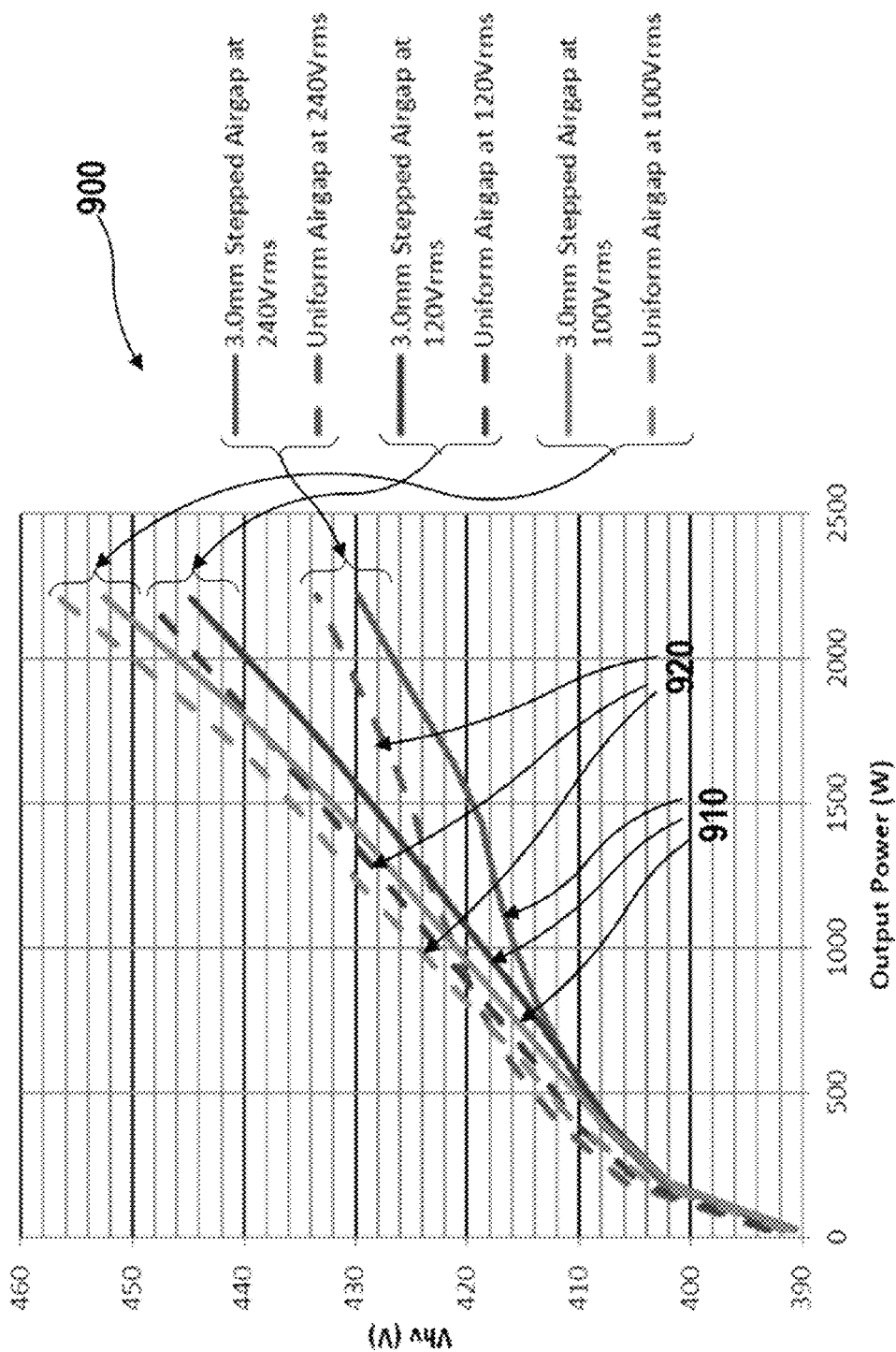

FIG. 9 shows example comparisons of Vhv curves between stepped (solid curves 910) and uniform (dashed curves 920) gap transformers. Vhv is a value of a clamp voltage absorbing leakage energy in each switching cycle as described in detail in co-pending U.S. application Ser. No. 13/891,503 entitled "Managing Leakage Inductance in a Power Supply" and filed on May 10, 2013, the contents of which is incorporated herein by reference in its entirety. It can be seen that use of a stepped gap decreases Vhv at substantially all input voltage levels, indicating a lower amount of leakage energy.

In some implementations, controllability of a power supply system (such as power supply 200) can be improved through use of a stepped gap system as described above. For instance, a stepped gap can result in a reduced switching frequency at higher input voltage (and low power operation) and thus improve an ability to control system 200 as described below.

A steady-state voltage conversion ratio (or gain, G) is given by the expression for $$\frac{V_o}{V_i}$$

described above, which depends on a ratio of number of transformer turns (N) and duty cycle D. In some examples, duty cycle D can be calculated by evaluating the ratio Ton/Ton+Toff, where Ton is a time duration when both switches of a power converter (e.g., switches 214A and 214B of FIG. 2) are turned ON and Toff is a time duration when one of the switches (switch 214A or 214B) is turned OFF. An effective minimum on-time, Ton$_{min}$ is limited by a fall time of voltages across switches connected to a primary side of a transformer in a power converter (e.g., switches 214A and 214B connected to the primary winding 209 of the transformer 208). For instance, the fall time of the voltage across switches 214A and 214B can be a function of a resonant transition defined by a magnetizing inductance and resonant capacitances. That is, the voltage across the switches 214A and 214B resonates to zero with a resonant frequency defined by the magnetizing inductance and resonant capacitances.

Figure 10:
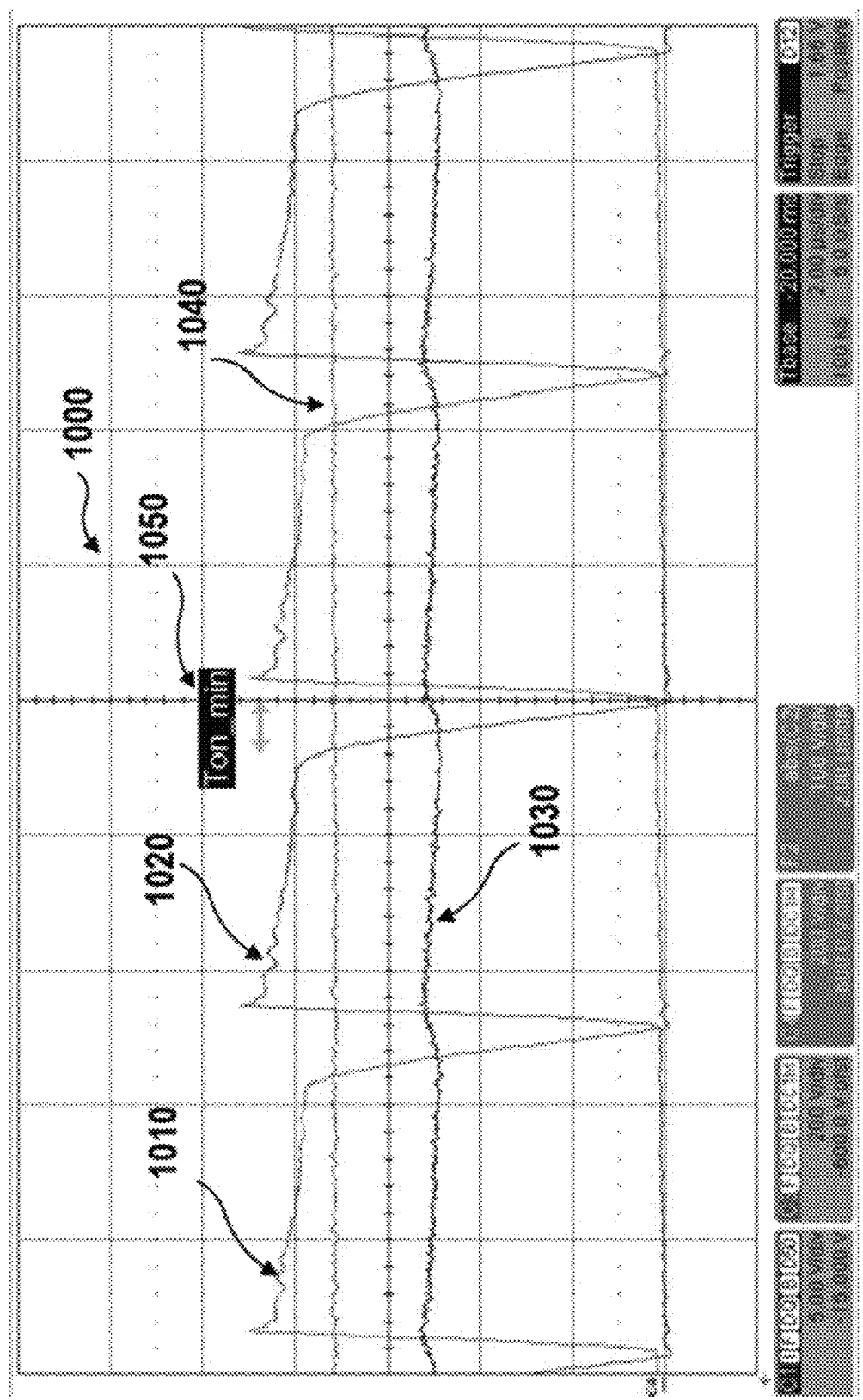
FIGS. 10-11 show example oscilloscope outputs.

Referring to FIG. 10, example waveforms 1000 are shown representing waveforms across switches 214A and 214B when a stepped gap system is used. As shown, waveform 1010 represents an instantaneous voltage across, e.g., switch 214A, and waveform 1020 represents an instantaneous voltage across, e.g., switch 214B. Waveform 1030 represents a current flowing through an input inductor L, in a power converter (e.g., inductor 210 of FIG. 2). Waveform 1040 represents an input rectified AC line voltage to the power converter (e.g., input voltage to converter 206 of FIG. 2).

As noted above, a fall time of the voltage across switches 214A and 214B can be limited by a resonant transition defined by a magnetizing inductance and resonant capacitances. For example, as shown, the inductor current (waveform 1030) rises during time period Ton$_{min}$ 1050. Given a minimum achievable duty cycle (e.g., D$_{min}$=Ton$_{min}$/Ton$_{min}$+Toff), to keep the current flowing through the inductor within a controllable range, a corresponding value of voltage averaged over the switching period time Ton$_{min}$+Toff (e.g., volt-seconds value) of the inductor is to be maintained at zero. In some implementations, to keep inductor current within a controllable range, a maximum input voltage may also satisfy the following expression:

$$Vimax=N(1-Dmin)Vo$$

In some implementations, an input voltage can exceed Vimax, rendering the current flowing through the input inductor L uncontrollable because the inductor's volt-seconds can increase substantially. In such implementations, current controllability can be extended to a higher input voltage range, e.g., by lower the minimum duty cycle D$_{min}$. In some examples, lowering the minimum duty cycle D$_{min}$ translates to increasing the off-time Toff for a same Ton$_{min}$ as noted by the minimum duty cycle expression described above.

As noted above, the switching frequency of a power converter is given by the following expression:

$$F_{sw} = \frac{(1-D)*N*V_o}{(L_m)*(2)*(I_{mpk})}$$

The above expression yields the following expressions, where T$_{sw}$ is the switching time (inverse of switching frequency):

$$F_{sw} = \frac{1}{T_{sw}} = \frac{T_{off}}{T_{sw}} * \frac{N*Vo}{(L_m)*(2)*(I_{mpk})}$$

$$T_{off} = \frac{(L_m)*(2)*(I_{mpk})}{N*V_o}$$

As can be seen from above expressions, in some implementations, adopting a stepped gap can result in a lower switching frequency. Consequently, in some implementations, the Toff duration can be increased, effecting an overall increase in inductor current controllability.

In some implementations utilizing a stepped gap system, smaller peak currents can be achieved for lighter loads without incurring regions where the inductor current is uncontrollable. For instance, to the extent that the product L$_m$*I$_{mpk}$ in the above expressions remain constant, smaller peaks for light loads can be achieved while still maintaining a substantially good degree of control over the inductor current.

Figure 11:
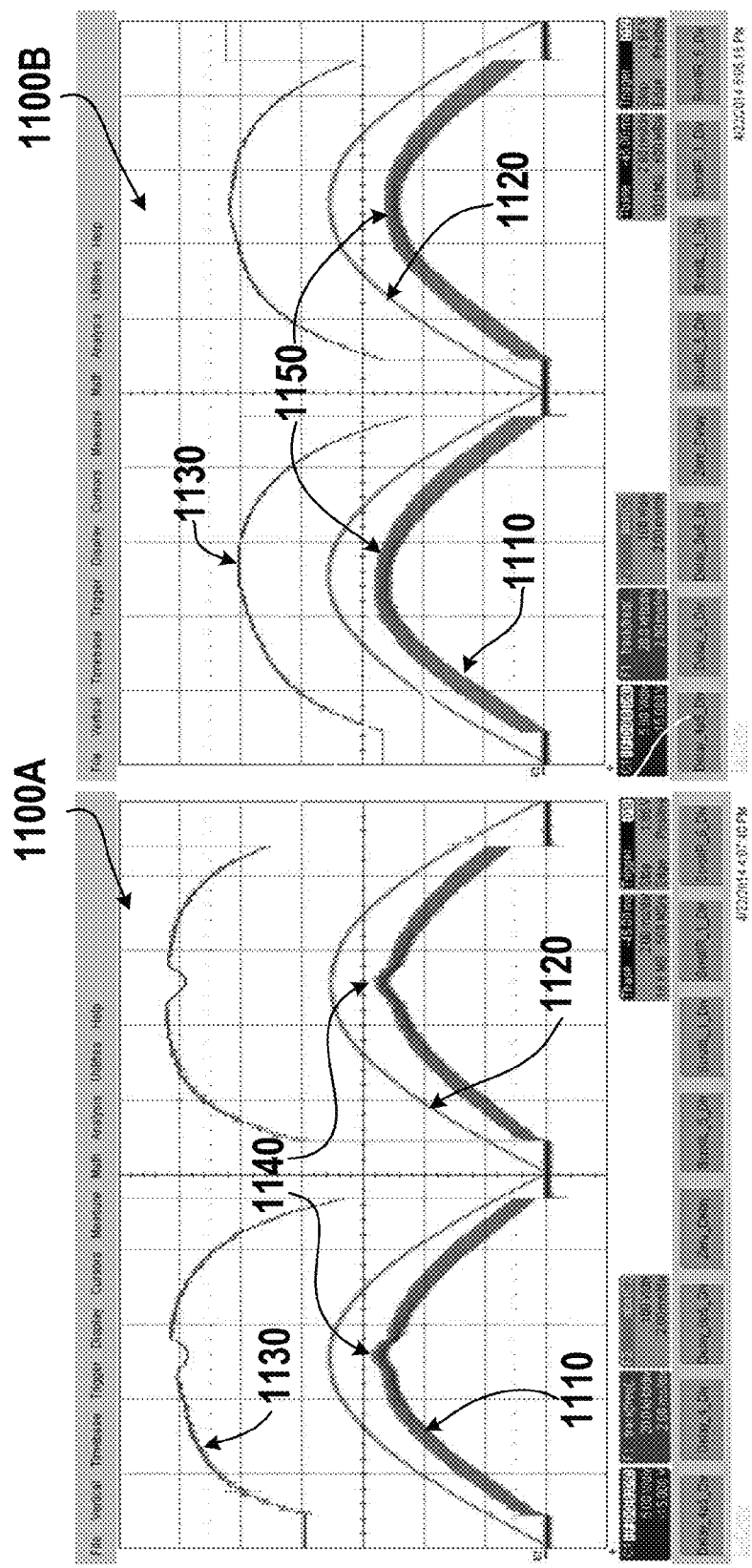
Figures 1, 11:
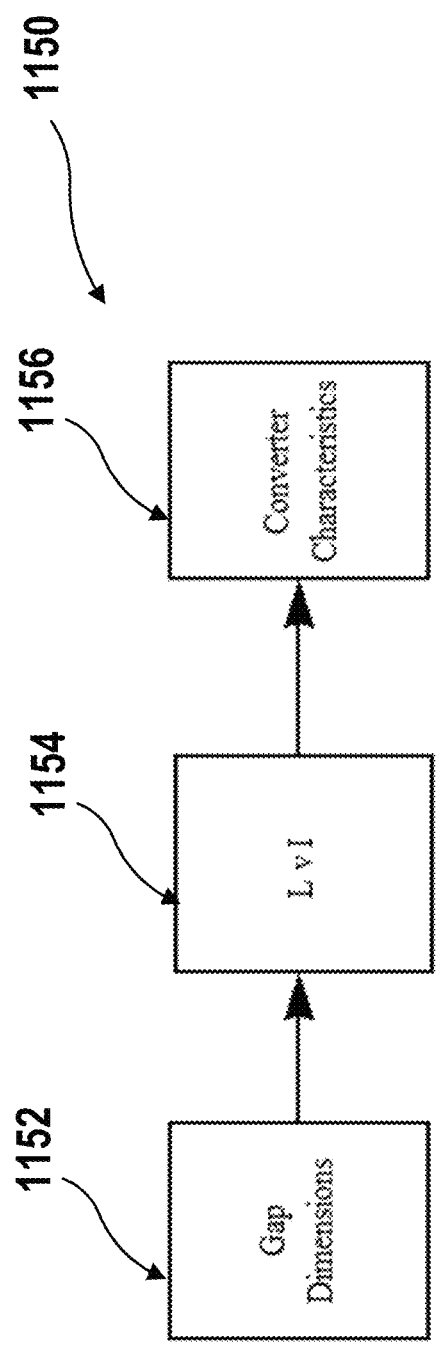
Figures 2, 11:
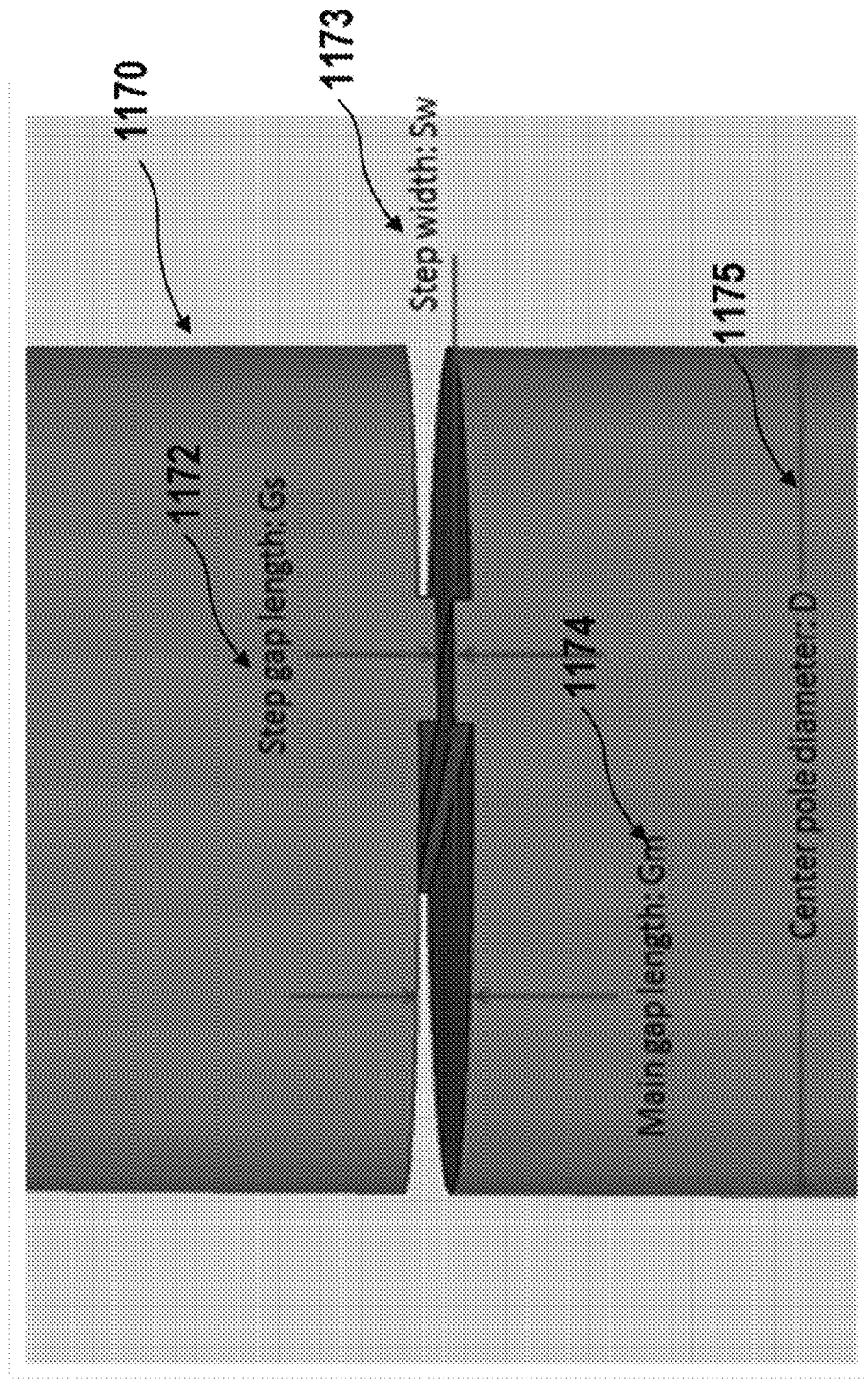

Referring to FIG. 11, example oscilloscope outputs corresponding to a uniform gap core (oscilloscope output 1100A) and a 3 mm wide stepped gap core (oscilloscope output 1100B) are shown. In an implementation, changing a size of the stepped gap core such that the magnetizing inductance Lm is larger at low input currents can affect zero-voltage operation of the converter. For example, for a same small amount of line voltage, a magnetizing current may be smaller and slower. As such, reflected pulses that develop across an opened switch may be small. An example process for determining one or more stepped gap dimensions is shown in connection with FIGS. 11-1, 11-2 described below. Waveforms 1110 represent the current flowing through the inductor (scaled to e.g., 5A/division). Waveforms 1120 represent the rectified input line voltage at, e.g., 255 Vrms/50 Hz.

Waveforms 1130 represent a variation in the switching frequency scaled at, e.g., 20 KHz/division. Comparing the oscilloscope outputs 1100A and 1100B, it can be seen that the heights of switching frequency waveforms 1130 are different. The difference in the heights of the switching frequency waveforms 1130 is due to a reduction in switching frequency from adopting a stepped gap core based transformer.

As shown, in both uniform gap and stepped gap cases, the inductor current follows the sinusoidal shape of the rectified input line voltage reference curve 1120. However, with a uniform gap core based transformer, the inductor current becomes uncontrollable, e.g., region 1140, near a peak of the input line voltage. This is substantially near the converter's maximum switching frequency (i.e., peak of waveform 1130). On the other hand, with a stepped gap core based transformer, the uncontrollable regions (e.g., regions 1140) are not present. As noted, because of the drop in switching frequency the inductor current becomes controllable.

FIG. 11-1 is flow diagram 1150 depicting an example translation of stepped gap dimensions into converter characteristics. For example, in a first step, initial gap dimensions can be obtained 1152. The dimensions can be input to an L v. I process 1154, and thereby determining 1156 converter characteristics. For example, in a current-fed push pull converter, the switching frequency Fsw can be additionally controlled by varying a magnitude of peak magnetizing current. As shown by the expression $$F_{sw} = \frac{(1-D)*N*V_o}{(L_m)*(2)*(I_{mpk})},$$

the switching frequency varies inversely as the peak magnetizing current Im pk, which correlates roughly to the input current. For instance, to limit switching frequency such that it does not exceed a predetermined high level threshold at low input currents a large Lm can be used. To limit switching frequency such that it does not go below a predetermined low level threshold at high input currents, a small Lm can be used.

FIG. 11-2 shows example dimensions of a stepped gap 1170. For example, the stepped gap dimensions can include a step gap length Gs 1172, a step width, Sw 1173, a main gap length, Gm 1174 and a center pole diameter, D 1175. For instance, one or more simulations can be performed to determine values for one or more of the stepped gap dimensions 1172-1175. An example of a simulation process can include magnetic finite element modeling. Through a process of simulation, prototyping, and measurement that can be iterated, a desired L v. I characteristic can be obtained. For example, a step area of the stepped gap 1170 can be in a range of 10-30% of the center pole total area. For example, the step area can be a function of the step width Sw 1153 and the center pole diameter D, where, e.g., for Sw<<D, step gap area≈D*Sw. For example, a step gap length, Gs 1172 can range between 10-50% of the main gap length, Gm 1174.

In some implementations, certain combinations of light loads and high input voltages can result in uncontrollable input current to the converter. A stepped gap core based transformer can improve current controllability by reducing a power converter's switching frequency and range. In some implementations, there can be cases where, e.g., a minimum duty cycle of the converter switches (e.g., a relative period of time when the converter switches are ON) can be reached before the design limits of the converter are reached. For example, the design limits can be a maximum allowable input voltage and/or a lightest load that the power converter is designed to handle. In such cases, the input current can no longer be controlled because a switching duty cycle cannot be varied any further. Techniques and systems described herein can vary a current conduction angle of the input current (Iac) to affect converter efficiency with varying loads. For example, a current chopping process can be used in a power converter to adjust the current conduction angle of the input current over a wide range of input voltages and loads. In some implementations, a commanded peak current management technique can be combined with a current chopping process that adjusts a current conduction angle of the input current.

In some instances, certain combinations of light loads and high input voltages can force a boost-type converter into a minimum duty cycle operation. In such an operation, a magnitude of the current flowing through the input inductor can become strongly coupled to the input voltage. As a result, in some implementations, the current flowing through the input inductor can become uncontrollable. As described above, a stepped gap core based transformer can improve current controllability by reducing a power converter's switching frequency and range. As such, a power converter implemented using a stepped gap core based transformer can achieve a minimum duty cycle that is lower than that possible in a power converter implemented using a uniform gap core based transformer.

In some situations, it can be advantageous to adapt a minimum value of the commanded peak current Ipk_cmd_min to improve the inductor current controllability under minimum duty cycle operating conditions.

In some implementations, a current conduction angle of the input inductor current (Iac) can also be adjusted to improve converter efficiency with varying loads. For example, a current chopping process can be used in a power converter to adjust the current conduction angle of the input inductor current over a wide range of input voltages and loads.

Figure 12:
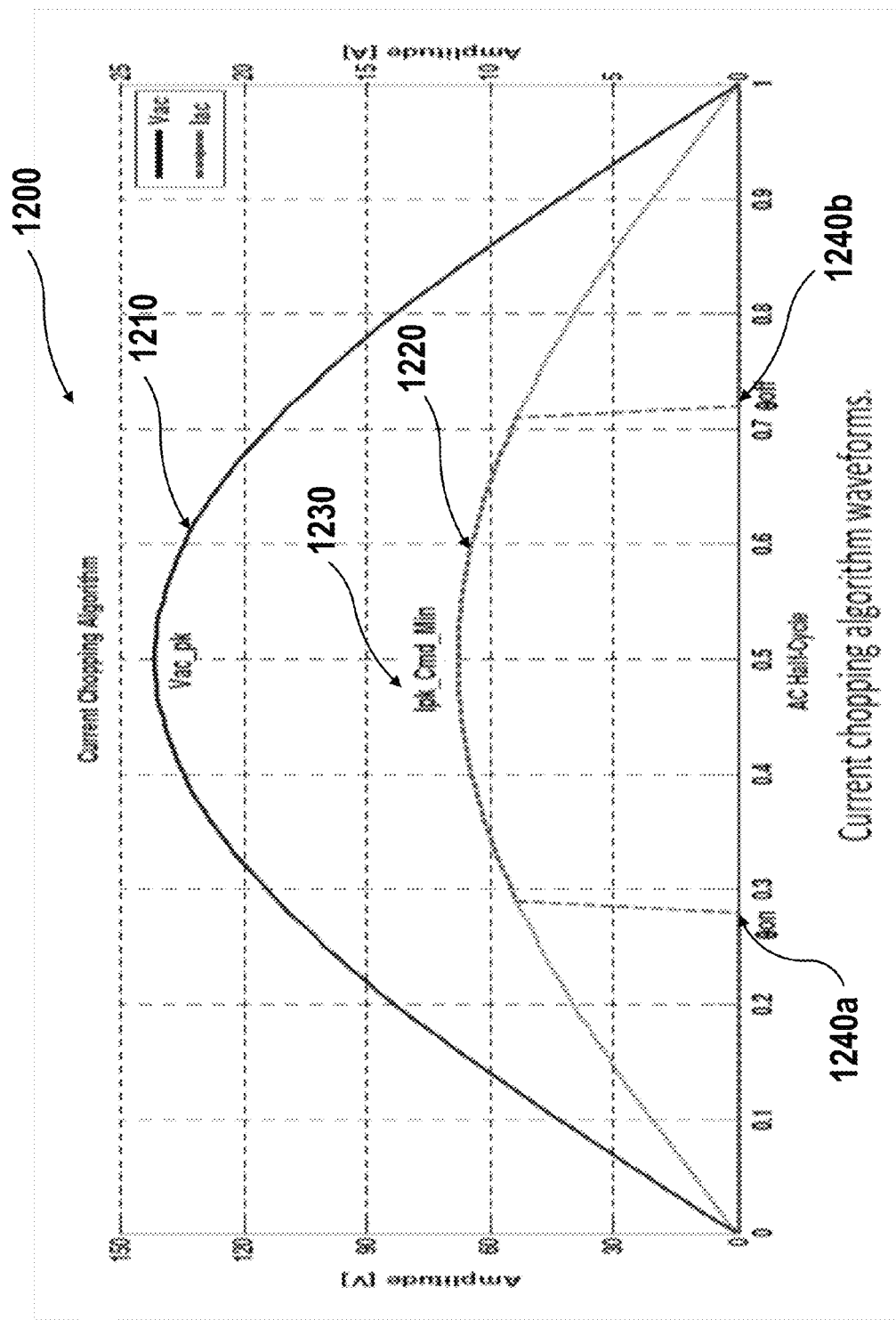
FIGS. 12-16 show example plots of voltage and current waveforms on which techniques disclosed herein are applied.

In some implementations, a commanded peak current management technique can be combined with a current chopping process that adjusts a current conduction angle of the input inductor current. For example, FIG. 12 shows example rectified input waveforms 1200 on which the techniques disclosed herein are applied. In particular, the rectified input waveforms 1200 include a rectified voltage Vac (waveform 1210) and inductor current Iac (waveform 1220) during a single AC line half-cycle.

As shown, the current Iac can be limited by a constant value of the commanded peak current Ipk_cmd_min 1230. In addition, a current chopping process can be implemented to chop the current Iac waveform 1220 at around start and stop conduction angles of $\theta_{on}$ and $\theta_{off}$ 1240a, 1240b as shown. As a result, in some cases, a conduction interval (i.e., the period of conduction between the conduction angles of $\theta_{on}$ and $\theta_{off}$ 1240a, 1240b) can be reduced as power demand decreases.

For example, a current chopping process can be active when an average power level is below a predetermined threshold. The predetermined threshold for the average power can be calculated, for instance, from the expression (Vac_pk*Ipk_cmd_min)/2, where Vac_pk is the instantaneous peak value of the AC output voltage, and Vac_pk=Vac_pk_min. In some implementations, the current chopping process can be deactivated when the power converter enters full conduction. For instance, the current chopping process can be deactivated when the average power level is above the predetermined threshold, e.g., greater than (Vac_pk*Ipk_cmd_min)/2.

Figure 13:
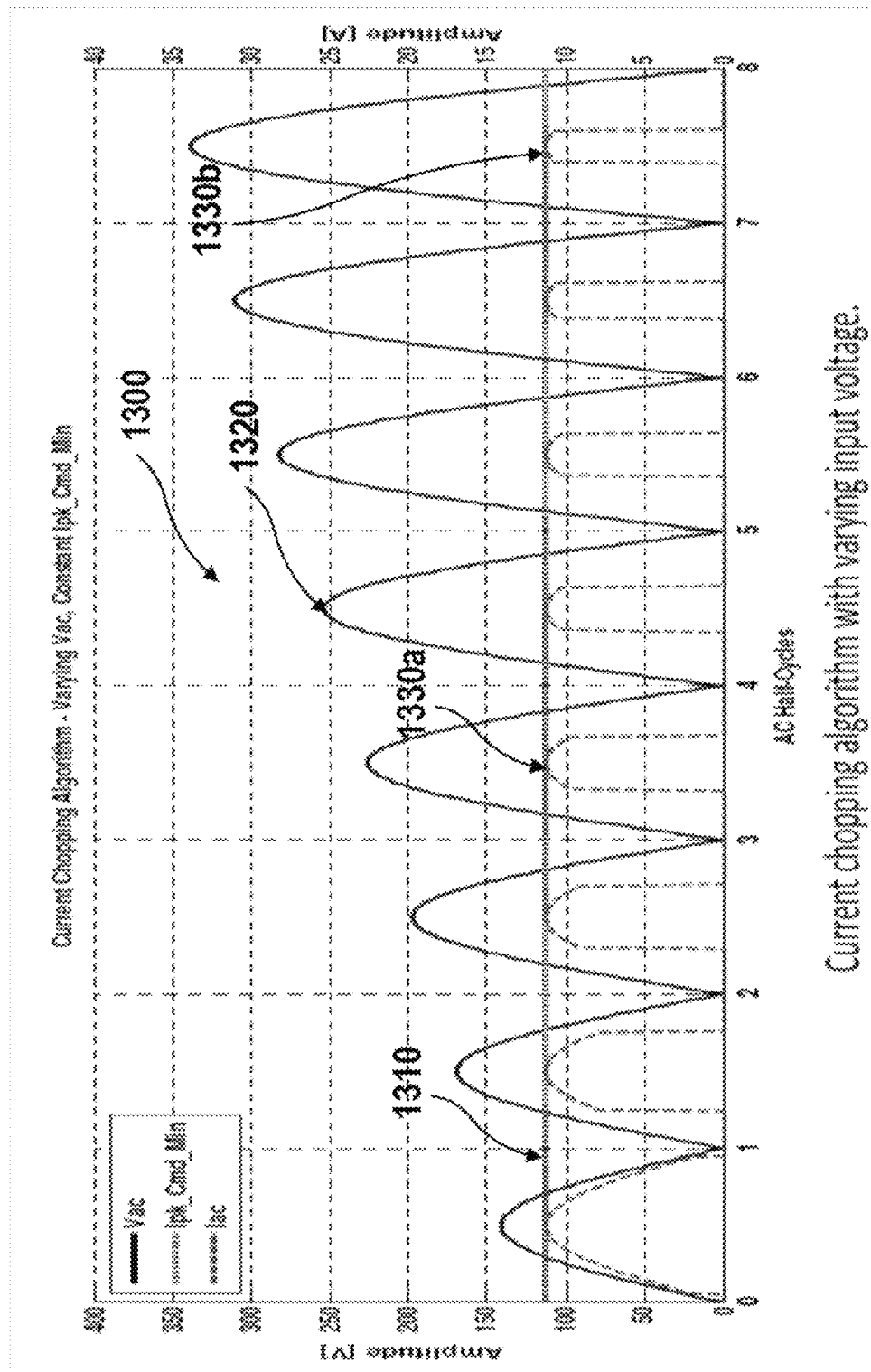
Figure 14:
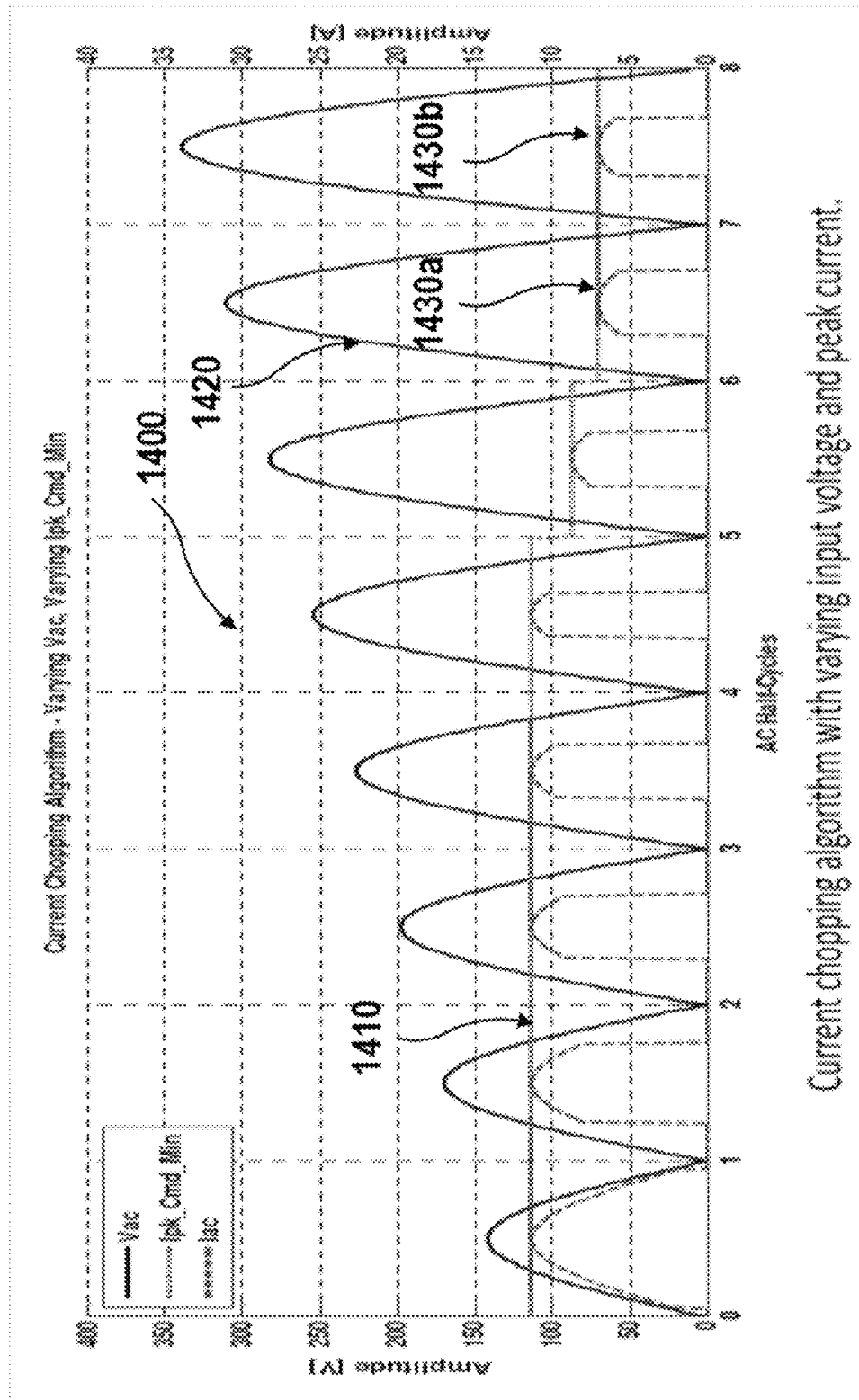
Figure 15:
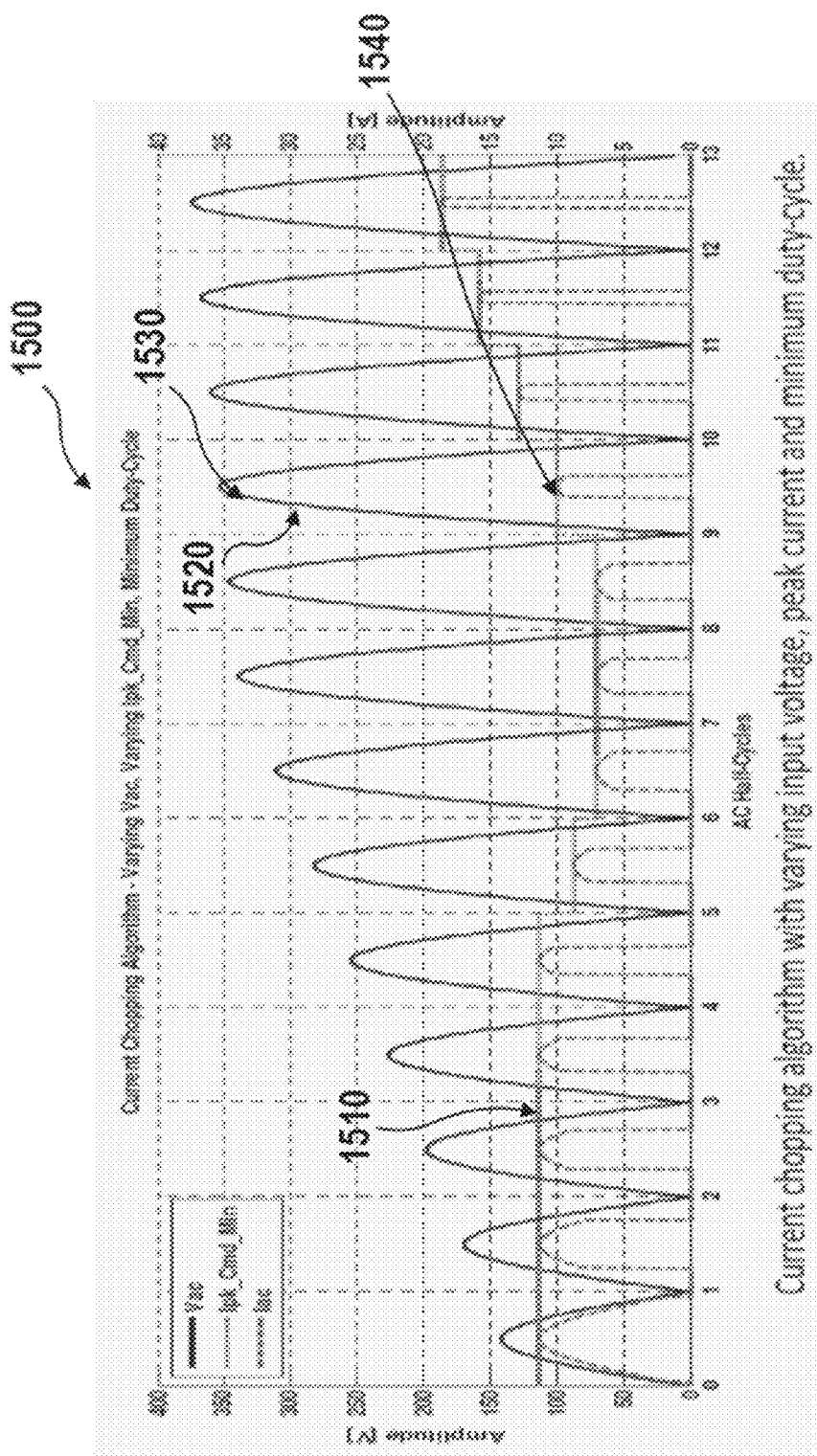

FIGS. 13-15 show example sets of waveforms 1300-1500 implementing commanded peak current management techniques incorporating a current chopping process as disclosed herein. In FIG. 13, for example, for a constant value of Ipk_cmd_min (see waveform 1310) and relatively small constant power, at higher Vac_pk values (see waveform 1320), Iac current pulses are chopped such that they become narrower with each half cycle and do not enter full conduction until very high power levels are needed. For example, the AC line voltage peak Vac_pk is increased from approximately 140V to about 340V, while keeping the average power constant at 800 W. As the peaks increase (see waveform 1320), the current pulses become narrower (e.g., pulse 1330a is wider than pulse 1330b).

In FIG. 14, for example, Ipk_cmd_min (see waveform 1410) and Vac_pk (see waveform 1420) are varied, while still maintaining a constant average power of approximately 800 W. To maintain a reasonable compromise between a power factor of the system and efficiency at both low and high line voltage levels, the value of Ipk_cmd_min can be reduced as Vac_pk increases. As shown, the chopped current pulses, e.g., pulses 1430a and 1430b, become wider than those of FIG. 13, e.g., pulse 1330b. As a result, a power factor of the power converter system can be improved.

In some implementations, when the line voltage peak Vac_pk reaches a high value, the minimum duty cycle is reached and the value of Ipk_cmd_min is to be increased to maintain current controllability. For example, in FIG. 15, Ipk_cmd_min (see waveform 1510) and Vac_pk (see waveform 1520) are varied. However, Vac_pk is increased from approximately 140V to around 375V. When Vac_pk is increased above a certain threshold, for instance, 345 V (threshold 1530), the minimum duty cycle of the system is reached. As a result, at point 1520, the Ipk_cmd_min value 1540 is increased to maintain current controllability.

Figure 16:
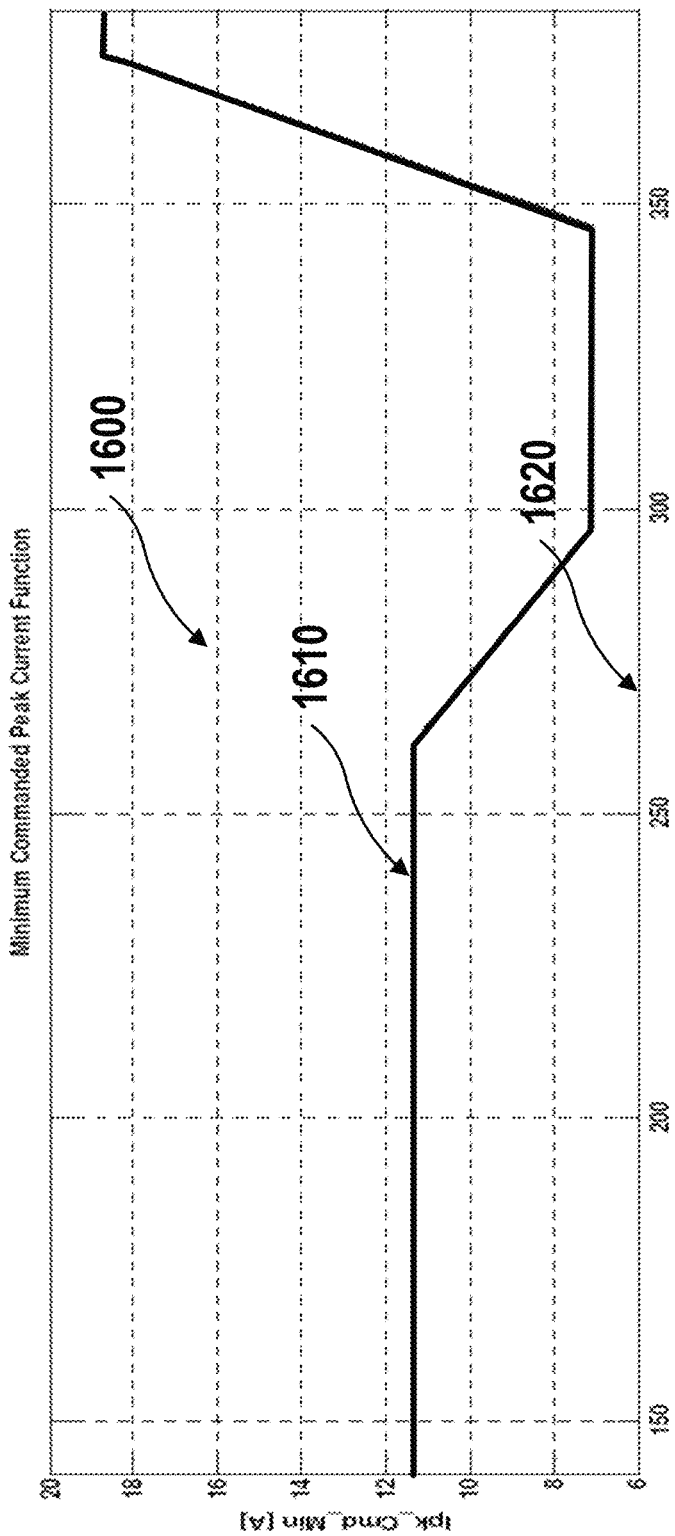
Figure 17:
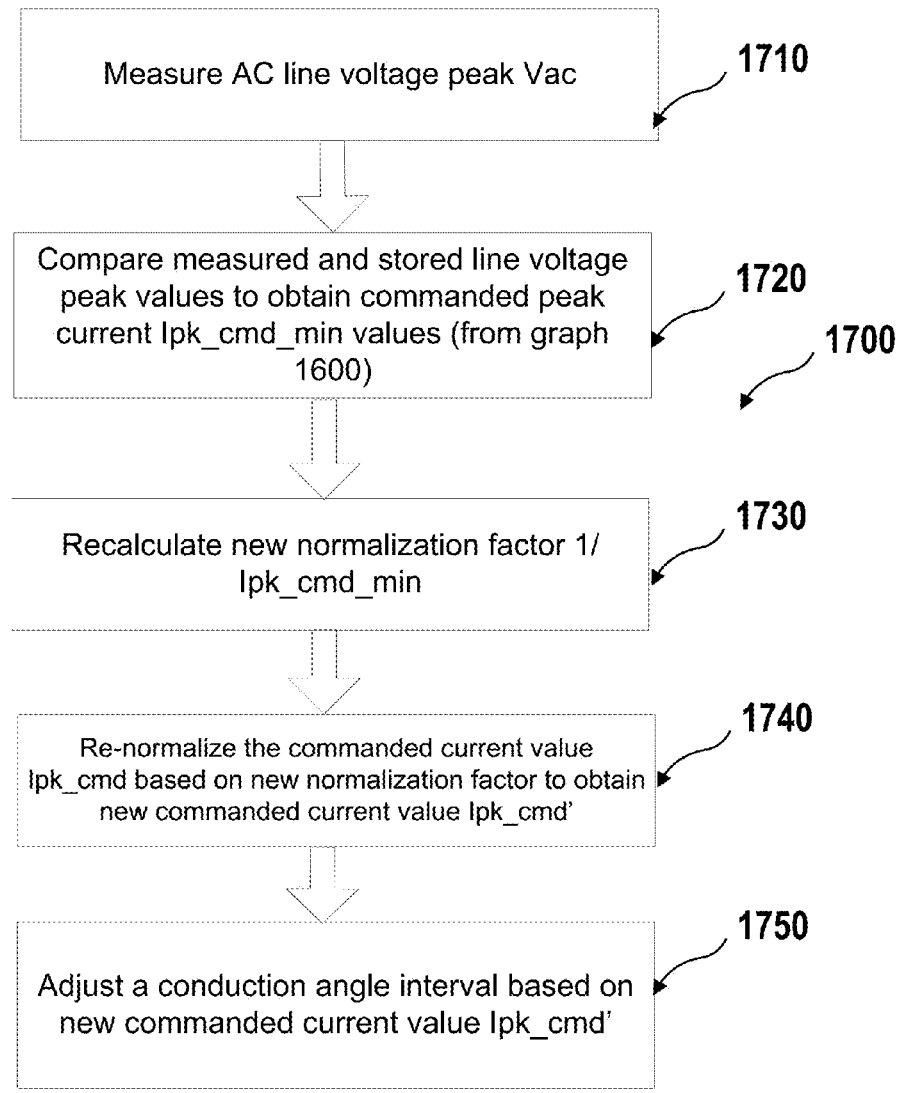
FIG. 17 shows an example routine for managing commanded peak current.

FIG. 16 shows a graph 1600 for managing minimum commanded peak current Ipk_cmd_min 1610 over a range of input peak voltages Vac_pk 1620. For example, the range of input peak voltages Vac_pk 1620 can be between 150V to 400 V. Referring to FIG. 17, a flowchart shows an example routine 1700 for managing the commanded peak current based on graph 1600. For example, the routine 1700 can manage a commanded peak current Ipk_cmd to improve power conversion system controllability, power factor correction, and efficiency over a wide input voltage range (e.g., range of input peak voltages Vac_pk 1620).

Example routine 1700 is shown to use commanded current Ipk_cmd to determine a conduction interval. In some implementations, an average power level of an input can be used for directly determining a conduction interval. For example, referring to FIG. 16, minimum commanded power threshold values, Pac_cmd_min, can be calculated using the following expression: Pac_cmd_min=Vac_pk*Ipk_cmd_min/2. Pac_cmd_min includes minimum average power threshold values for deactivating adjustment of the conduction interval. In some implementations, an underlying power supply voltage feedback control process can be designed to produce the Ipk_cmd value as a controlled variable used in routine 1700.

As shown, the routine 1700 causes the AC line voltage peak Vac_pk to be measured 1710. The routine 1700 then causes the measured AC line voltage peak Vac_pk to be compared 1720 with the peak voltage Vac_pk 1620 values of graph 1600 to obtain a corresponding value of minimum commanded peak current Ipk_cmd_min. For example, graph 1600 can be implemented in a form of a table stored in a computer memory or a programmable memory device. The routine 1700 can recalculate 1730 a new normalization factor expressed as $$\frac{1}{Ipk\_cmd\_min}.$$

The routine 1700 can re-normalize 1740 the commanded current Ipk_cmd value based on the new normalization factor, resulting in a new $$Ipk\_cmd' = \frac{Ipk\_cmd}{Ipk\_cmd\_min}.$$

The routine 1700 can then adjust 1750 a conduction angle interval (e.g., conduction angles between $\theta_{on}$ and $\theta_{off}$ 1240a, 1240b of FIG. 12) according to the newly normalized current Ipk_cmd'. For instance, routine 1700 can adjust the conduction angle interval such that an average power remains unchanged for a same commanded current and different input voltage levels.

Figure 18:
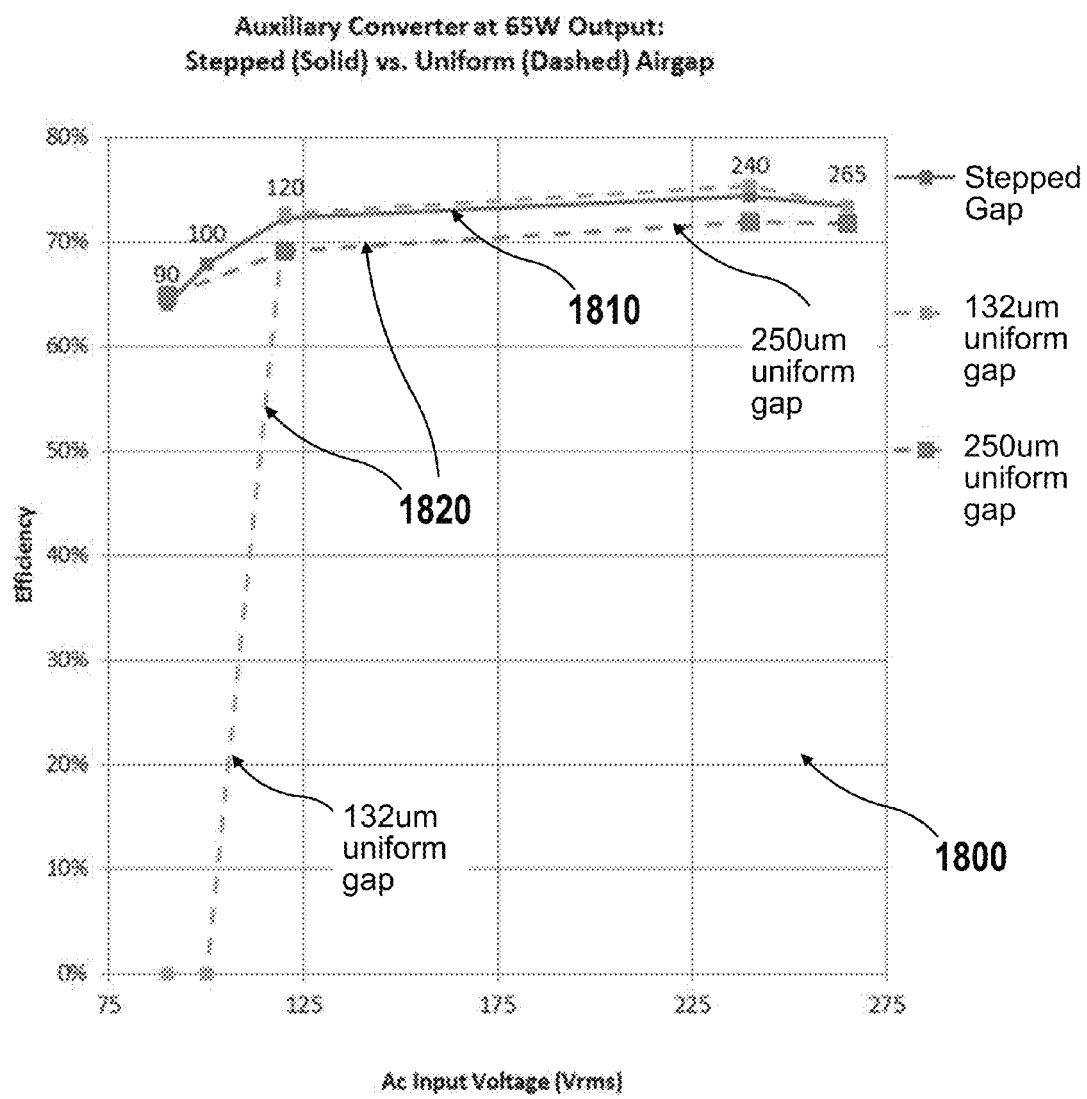
FIG. 18 shows example efficiency profiles of stepped and non-stepped gap core based transformers in quasi-resonant flyback converters.

The techniques described herein can be implemented in other types of power converters. For example, the stepped gap core based transformer and current control techniques described herein can be used in other converters that use a magnetizing inductance to drive a resonant transition such as a current fed resonant full bridge, or a quasi-resonant flyback converter. Referring to FIG. 18, an example efficiency comparison of a stepped gap core based transformer and a non-stepped (uniform) gap core based transformer in a quasi-resonant flyback converter is shown. Curve 1810 represents an efficiency of a stepped gap core based transformer over a range of input voltages (e.g., 75-275 V) at a constant output power (e.g., 65 W) for a quasi-resonant flyback converter. Curves 1820 represents efficiencies of two types of non-stepped gap core based transformers (132 micrometer and 250 micrometers gaps) over a same range of input voltages and at a same constant output power for a quasi-resonant flyback converter.

A 132 micrometer uniform gap core design gives a larger Lm, and the associated lower switching frequency results in a higher operating efficiency. However, in some cases, such a design may not operate well at lower line voltages because not enough energy can be stored in the small gap. A 250 micrometer uniform gap core design can achieve operation across an entire range of operating voltage values, but at a lower efficiency because of a resultant higher operating frequency (and higher currents). The stepped gap core design variant, on the other hand, can provide benefits of both high operating efficiencies at lower input voltages and an improved efficiency profile at higher operating voltages.

It is to be understood that the foregoing description is intended to illustrate and not to limit the scope of the claims of the appended claims. Other implementations are within the scope of the claims.

Though the elements of several views of the drawing may be shown and described as discrete elements in a block diagram and may be referred to as "circuit" or "circuitry," unless otherwise indicated, the elements can be implemented as one of, or a combination of, analog circuitry, digital circuitry, or one or more microprocessors executing software instructions. Software instructions can include digital signal processing (DSP) instructions. Operations may be performed by analog circuitry or by a microprocessor executing software that performs the mathematical or logical equivalent to the analog operation. Unless otherwise indicated, signal lines may be implemented as discrete analog or digital signal lines, as a single discrete digital signal line with appropriate signal processing to process separate streams of audio signals, or as elements of a wireless communication system. Some of the processes may be described in block diagrams. The activities that are performed in each block may be performed by one element or by a plurality of elements, and may be separated in time. The elements that perform the activities of a block may be physically separated. Unless otherwise indicated, audio signals or video signals or both may be encoded and transmitted in either digital or analog form; conventional digital-to-analog or analog-to-digital converters may not be shown in the figures.

What is claimed is:

1. A method used in a circuit comprising a first converter stage of a power converter circuit implementing a push-pull topology, and an isolating element comprising a magnetizing inductance for isolating a primary side of the first converter stage from a secondary side of the first converter stage, the method comprising:
varying a switching frequency of the power converter circuit by causing the magnetizing inductance of the isolating element to vary over a range of values of input current flowing through the primary side of the first converter stage,
holding a duty cycle of the power converter circuit to be substantially constant during the variation of the switching frequency of the power converter circuit,
lowering a minimum value of the duty cycle to extend a range of control over the input current flowing through the primary side of the first converter stage and adjusting a current conduction angle of the input current.

2. The method of claim 1, further comprising adjusting a current conduction angle of the input current based on an average input power level to the power converter circuit.

3. The method of claim 1, further comprising:
determining a peak line voltage value of an input AC voltage to the power converter circuit;
comparing the peak line voltage to stored peak line voltage values to determine a corresponding minimum commanded peak current value;

computing a commanded current value corresponding to the peak line voltage value based on the determined corresponding minimum commanded peak current value; and adjusting a conduction interval of the input current based on the computed new commanded current value.

4. A method used in a circuit comprising a first converter stage of a power converter circuit implementing a push-pull topology, and an isolating element comprising a magnetizing inductance for isolating a primary side of the first converter stage from a secondary side of the first converter stage, the method comprising:

varying a switching frequency of the power converter circuit by causing the magnetizing inductance of the isolating element to vary over a range of values of input current flowing through the primary side of the first converter stage;

further comprising adjusting a current conduction angle of the input current based on an average input power level to the power converter circuit.

5. The method of claim 4, wherein adjusting the conduction interval comprises increasing a conduction angle as power output from the power converter circuit increases.

6. The method of claim 4, wherein adjusting a conduction interval comprises:

determining an average power level of the input power to the power converter circuit; and if the average power level is greater than a predetermined threshold of the average power level, deactivating the adjusting of the conduction interval of the input current.

7. The method of claim 6, wherein the predetermined threshold of the average power level is a product of a minimum peak value within an operating range of peak voltage values of the input AC voltage to the power converter circuit and the corresponding minimum commanded peak current value.

8. The method of claim 1, wherein the power converter circuit comprises a quasi-resonant flyback converter.

9. The method of claim 1, wherein the secondary side comprises at least one capacitor configured to filter an output voltage for the power converter circuit.

10. The method of claim 1, wherein the secondary side is configured to provide at least 200 W of power when the primary side is coupled to an AC line voltage.

11. The method of claim 1, wherein the secondary side is configured to provide at least 500 W of power when the primary side is coupled to an AC line voltage.

12. The method of claim 1, wherein the secondary side is configured to provide at least 2 kW of power when the primary side is coupled to an AC line voltage.

13. The method of claim 4, further comprising calculating a set of the stored minimum commanded peak current values based on an analysis of a range of input voltages to and loads on the power converter circuit.

14. A method used in a circuit comprising a first converter stage of a power converter circuit implementing a push-pull topology, and an isolating element comprising a magnetizing inductance for isolating a primary side of the first converter stage from a secondary side of the first converter stage, the method comprising:

varying a switching frequency of the power converter circuit by causing the magnetizing inductance of the isolating element to vary over a range of values of input current flowing through the primary side of the first converter stage;

further comprising:

determining a peak line voltage value of an input AC voltage to the power converter circuit;

comparing the peak line voltage to stored peak line voltage values to determine a corresponding minimum commanded peak current value;

computing a commanded current value corresponding to the peak line voltage value based on the determined corresponding minimum commanded peak current value; and adjusting a conduction interval of the input current based on the computed new commanded current value.

* * * * *